United States Patent [19]

Moshier et al.

[11] Patent Number: 4,738,389

[45] Date of Patent: Apr. 19, 1988

[54] WELDING USING METAL-CERAMIC COMPOSITES

[75] Inventors: William C. Moshier, Glen Burnie; Dennis C. Nagle, Ellicott City; John M. Brupbacher; Leontios Christodoulou, both of Baltimore, all of Md.

[73] Assignee: Martin Marietta Corporation, Bethesda, Md.

[21] Appl. No.: 845,728

[22] Filed: Mar. 28, 1986

Related U.S. Application Data

[63] Continuation-in-part of Ser. No. 662,928, Oct. 19, 1984, abandoned.

[51] Int. Cl.⁴ .............................................. B23K 31/00
[52] U.S. Cl. ..................................... 228/198; 228/148
[58] Field of Search ............... 228/122, 123, 198, 148, 228/246, 248

[56] References Cited

U.S. PATENT DOCUMENTS 3,903,585  9/1975  Kosteruk et al. ................... 228/122
3,915,369 10/1985  Schmidt-Bruecken et al. .... 228/198
3,926,571 12/1975  Labossien et al. .................. 228/122
4,046,302  9/1977  Schladitz ............................. 228/198

FOREIGN PATENT DOCUMENTS 1920 1/1980 Japan ................................... 228/198
3987 1/1985 Japan ................................... 228/198

OTHER PUBLICATIONS

Welding: Principles and Practice, Henry Horwitz, P. E., Chapter 2, pp. 12-13, and Chapter 8, pp. 182, 188, and 190-191, 1979.
Metals Handbook Ninth Edition, vol. 6, Welding, Brazing, and Soldering, American Society for Metals, pp. 26-28, 1978.

Primary Examiner—M. Jordan
Attorney, Agent, or Firm—Herbert W. Mylius; Gay Chin

[57] ABSTRACT

A method for welding metal composite materials, including metal-ceramic composites, whereby a weld or filler material is prepared by the in-situ precipitation of ceramic in a metallic matrix. The filler material may comprise boride, carbide, oxide, nitride, silicide, etc., while the matrix metal may constitute a alloy or intermetallic of two or more metals. A strong bond is achieved when welding two conventional metals, a conventional metal and a metal-ceramic composite, or two metal-ceramic composites.

77 Claims, 3 Drawing Sheets

SCHEMATIC

WELDING USING METAL-CERAMIC COMPOSITES

This application is a continuation-in-part of U.S. patent application Ser. No. 662,928, filed Oct. 19, 1984, abandoned 5-21-87 refiled FWC.

The invention relates generally to welding using certain metal-ceramic composites and, more particularly, the invention relates to using these metal-ceramic composites as a weld or filler material, i.e., the material added or deposited in the formation of a weld on one or more metal containing bodies; forming weld rod of the metal-ceramic composites or precursors thereof; and welding one or more bodies of the metal-ceramic composites with conventional weld filler materials. The process for forming the metal-ceramic composites used herein includes an in-situ precipitation of ceramic material in a metallic matrix, wherein the ceramic comprises a boride, carbide, oxide, nitride, silicide, etc., of one or more metals other than the matrix metal. The matrix metal, moreover, may constitute an alloy or intermetallic of two or more metals.

BACKGROUND OF THE INVENTION

For the past several years, extensive research has been devoted to the development of metal-ceramic composites such as aluminum reinforced with carbon, boron, silicon carbide, silica, or alumina fibers, whiskers, or particles. Metal-ceramic composites with excellent high temperature yield strengths and creep resistance have been fabricated by the dispersion of very fine (less than 0.1 micron) oxide or carbide particles throughout the metal or alloy matrix.

Prior art techniques for the production of metal-ceramic composites may be broadly categorized as powder metallurgical approaches, molten metal techniques and internal oxidation processes. The powder metallurgical type production of such dispersion-strengthened composites would ideally be accomplished by mechanically mixing metal powders of approximately 5 micron diameter or less with the oxide or carbide powder (preferably 0.01 micron to 0.1 micron). High speed blending techniques or conventional procedures such as ball milling may be used to mix the powder. Standard powder metallurgy techniques are then employed to form the final composite. Conventionally, however, the ceramic component is large, i.e. greater than 1 micron, due to a lack of availability, and high cost, of very small particle size materials since their production is energy intensive, time consuming and costly in capital equipment. Furthermore production of very small particles inevitably leads to contamination of the particles with oxides, nitrides and materials from the attritor such as steel. The presence of these contaminants inhibits particle to metal bonding which in turn compromises the mechanical properties of the resultant composite. Further, in many cases where the particulate materials are available in the desired size, they are extremely hazardous due to their pyrophoric nature.

Alternatively, molten metal infiltration of a continuous ceramic skeleton has been used to produce composites. In most cases elaborate particle coating techniques have been developed to protect ceramic particles from molten metal during molten metal infiltration and to improve bonding between the metal and ceramic. Techniques such as this have resulted in the formation of silicon carbide-aluminum composites, frequently referred to as SiC/Al, or SiC aluminum. This approach is only suitable for large particulate ceramics (e.g. greater than 1 micron). The ceramic material, such as silicon carbide, is pressed to form a compact, and liquid metal is forced into the packed bed to fill the interstices. Such a technique is illustrated in U.S. Pat. No. 4,444,603, of Yamatsuta et al, issued Apr. 24, 1984. Because of the necessity for coating techniques and molten metal handling equipment capable of generating extremely high pressures, molten metal infiltration has not been a practical process for making metal-ceramic composites, particularly for making composites of submicron particles where press size and pressures needed would be extremely large.

As mentioned previously, the presence of oxygen in ball-milled powders used in the prior art metallurgy techniques, or in molten metal infiltration, can result in oxide formation at the interface of the ceramic and the metal. The presence of such oxides may inhibit interfacial binding between the ceramic phase and the matrix, thus adversely effecting ductility of the composite. Such weakened interfacial contact may also result in reduced strength, loss of elongation, and facilitated crack propagation.

Internal oxidation of a metal containing a more reactive component has also been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. This technique, although limited to relatively few systems since the two metals must have a wide difference in chemical reactivity, has offered a feasible method for dispersion hardening. In addition, the highest possible level of dispersoids formed in the resultant dispersion strengthened metal is generally insufficient to impart significant changes in properties such as modulus, hardness and the like.

Because of the above-noted difficulties with conventional processes, the preparation of metal-ceramic composites with submicron ceramic dispersoids for commercial applications has not been economically feasible nor practical.

In recent years, numerous ceramics have been formed using a process referred to as self-propagating high-temperature synthesis (SHS), which involves an exothermic, self-sustaining reaction which propagates through a mixture of compressed powders. Generally the SHS process is ignited by electrical impulse, laser, thermite, spark, etc. The SHS process involves mixing and compacting powders of the constituent elements, and igniting the green compact with a suitable heat source. On ignition, sufficient heat is released to support a self-sustaining reaction, which permits the use of sudden, low power initiation of high temperatures, rather than bulk heating over long times at lower temperatures. Exemplary of these techniques are the patents of Merzhanov et al. In U.S. Pat. No. 3,726,643, there is taught a method for producing high-melting refractory inorganic compounds by mixing at least one metal selected from groups IV, V, and VI of the Periodic System with a non-metal such as carbon, boron, silicon, sulfur, or liquid nitrogen, and heating the surface of the mixture to produce a local temperature adequate to initiate a combustion process. In U.S. Pat. No. 4,161,512, a process is taught for preparing titanium carbide by ignition of a mixture consisting of 80–88 percent titanium and 20–12 percent carbon, resulting in an exothermic reaction of the mixture under conditions of layer-by-layer combustion. These references deal with the preparation of ceramic materials, in the absence of a second non-reactive metallic phase.

Similarly, U.S. Pat. No. 4,431,448 teaches preparation of a hard alloy by intermixing powders of titanium, boron, carbon, and a Group I-B binder metal, such as copper or silver, compression of the mixture, local ignition thereof to initiate the exothermic reaction of titanium with boron and carbon, and propagation of the reaction, resulting in an alloy comprising titanium diboride, titanium carbide, and the binder metal. This reference, however, is limited to the use of Group I-B metals such as copper and silver, as binders, and requires local ignition. As is set forth in the patent, products made by this method have low density, requiring subsequent compression and compaction.

It has been recognized for a considerable period of time that certain types of exothermic reactions can be used in forming welds. For example, U.S. Pat. No. 1,872,254 to deGolyer discloses that refractory metals and alloys or metals and alloys having high thermal conductivity can be welded by means of utilizing the exothermic values of the reaction of certain intermediate compounds containing boron, such as borides or chemical compounds of boron with metal, with metallic oxides in conjunction with heat supplied by an electric arc, oxyacetylene flame or mechanical means. The heat supplied to the weld area aids in melting the metal being welded and and metal being added, and also raises the temperature of the metal oxide and boride to a point at which the boride will act to reduce the oxide.

This patent further discloses that when, it is desirable to use a boride which is substantially insoluble in the metal welded, the weld metal, or both, intermetallic compounds of boron with barium, calcium, lithium, silicon and magnesium are particularly valuable. When a boride is employed which is not soluble in either the welded metal or the weld metal, no residual metallic impurities can result from the use of the intermetallic boron compound, and consequently the composition and character of the metals entering into the weld will not be altered.

U.S. Pat. No. 3,415,697 to Bredzs et al discloses the fluxless brazing of aluminum and aluminum alloys by employing an unreacted mixture of a particulate aluminum alloy of a first element and a particulate component containing a second element. The first and second elements are capable of reacting exothermically to form a high-melting intermetallic compound when the mixture is heated to the molten state. In brazing operations, wherein the surfaces to be joined are not subjected to melting, the mixture is placed in contact with the aluminum surfaces to be joined and is heated to melt the mixture and produce an exothermic reaction. The filler metal thus formed is permitted to solidify to form a brazed joint. This reference is limited to brazing, as opposed to welding, however, and does not teach the formation of ceramic materials.

In U.S. Pat. No. 3,890,168 to Shumway, there is disclosed an apparatus, process and composition for producing a weldable joint between ferrous parts. In the process, the opposing wall surfaces of the parts to be joined are supported so as to define a gap therebetween and a solid weld element is nested in the gap. The weld element includes a suitable ignitable or pyro composition adapted to substantially instantaneously ignite to produce molten ferrous weld material and to heat opposing wall surfaces so as to receive and fuse with the molten weld material. The weld element, in one embodiment, was in the form of a rod having a core of flux material, the rod being composed of suitable exothermic reactants, slag control materials, ferrous weld material sources and alloying agents.

SUMMARY OF THE INVENTION

One facet of the the present invention relates to a method for welding, said method comprising providing a first and second body, each of said bodies comprising metal containing material and having a welding surface, i.e., that portion of the body to be contacted by filler material. The bodies are then placed such that a welding surface of the first body is in close proximity to a welding surface of the second body. Reactive ceramic forming constituents are contacted, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate submicron ceramic particles in-situ in said solvent metal, so as to produce a material comprising finely divided ceramic particles in a metal matrix in such a position as to join the two welding surfaces.

Also comprehended by the present invention is a method for making a welding rod, comprising producing a material comprising finely divided ceramic particles in a metal matrix by the processes disclosed herein and then forming the produced material into a welding rod shape. Further included in the present invention is a method for welding comprising producing a body of material comprising finely divided ceramic particles in a metal matrix by the processes disclosed herein, placing the produced body adjacent a second metal containing body, and then welding the produced body to the second body by subjecting weld material to a temperature sufficient to melt at least a portion of the weld material and then solidifying the weld material to join the produced body to the second body. The invention further includes a method for joining two metal containing bodies, said method comprising producing a weld material comprising finely divided ceramic particles in a metal matrix by the processes disclosed herein, placing the two metal containing bodies in close proximity to each other, subjecting said weld material to a temperature sufficient to melt at least some of said weld material and deposit the molten weld material in such a position to join the two bodies, and solidifying the molten weld material so as to join the welding surfaces of the bodies. The present invention also includes a method for reinforcing a metal containing body by producing a weld material comprising finely divided ceramic particles in a metal matrix by the processes disclosed herein, subjecting said weld material to a temperature sufficient to melt at least some of said weld material and deposit the molten weld material in the appropriate location on the body, and solidifying the molten weld material so as to reinforce the body.

In summary, the present invention comprehends the following welding applications as shown in Table 1:

TABLE 1

| Body No. 1 | Weld or Filler Material | Body No. 2 |
|---|---|---|
| conventional metal containing material** | metal-ceramic composite* | none |
| metal-ceramic composite* | metal-ceramic composite* | none |
| metal-ceramic composite* | conventional metal containing material** | metal-ceramic composite* |
| metal-ceramic composite* | conventional metal containing material** | conventional metal containing material** |
| conventional metal containing material** | metal-ceramic composite* | conventional metal containing material** |
| conventional metal containing material** | metal-ceramic composite* | metal-ceramic composite* |
| metal-ceramic composite* | metal-ceramic composite* | metal-ceramic composite* |

*Made by the processes disclosed herein.
**Conventional metal containing material includes metals and alloys (including powder metallurgical products) and metal containing composites (including powder metallurgical products).

In the above table, when a metal-ceramic composite is used as the weld or filler material, the ceramic dispersoid may be formed prior to the welding operation, or simultaneously with the welding operation.

Generally, the processes for forming metal-ceramic composite materials comprising finely divided ceramic particles in a metal matrix utilize an in-situ precipitation of up to about 95 percent by weight of a ceramic material in the metallic matrix, wherein the ceramic comprises a boride, carbide, oxide, nitride, silicide, aluminide, selenide, sulfide, or germanide, of a metal other than the matrix metal. It has been found that by mixing the constituents or elements of the desired ceramic material with a solvent matrix metal, and heating to a temperature at which substantial diffusion and/or solvation of the reactive elements in the matrix can occur, typically, close to the melting point of the solvent matrix metal, a solvent assisted reaction, which is generally exothermic, can be initiated. This solvent assisted reaction results in the extremely rapid formation and dispersion of finely divided particles of the ceramic material in the metal matrix. While the processes may be associated with pure metal systems, it is also applicable to alloys wherein at least two alloying elements react to form a ceramic precipitate in a matrix of the metal or an alloy thereof.

One embodiment for the above process for forming composite materials comprising one or more ceramic materials in a metallic matrix is to provide a substantially molten mass containing the matrix metal and then adding at least one of the constituents or elements of the desired ceramic material to the molten mass, thereby initiating the solvent assisted in-situ precipitation reaction to form and disperse finely divided particles of the ceramic material in the metal matrix.

Another embodiment of the above process for forming metal-ceramic composite materials comprises precipitating at least one ceramic material in a metal matrix by contacting reactive ceramic forming constituents, in the presence of a metal in which said ceramic forming constituents are more soluble than said ceramic phase, at a temperature at which sufficient diffusion of said constituents into said solvent metal occurs to initiate the reaction of said constituents to produce a material comprising finely divided particles of ceramic material in a metal matrix, and then introducing the produced material into a molten metal containing material.

DESCRIPTION OF PREFFERED EMBODIMENTS

Figure 1:
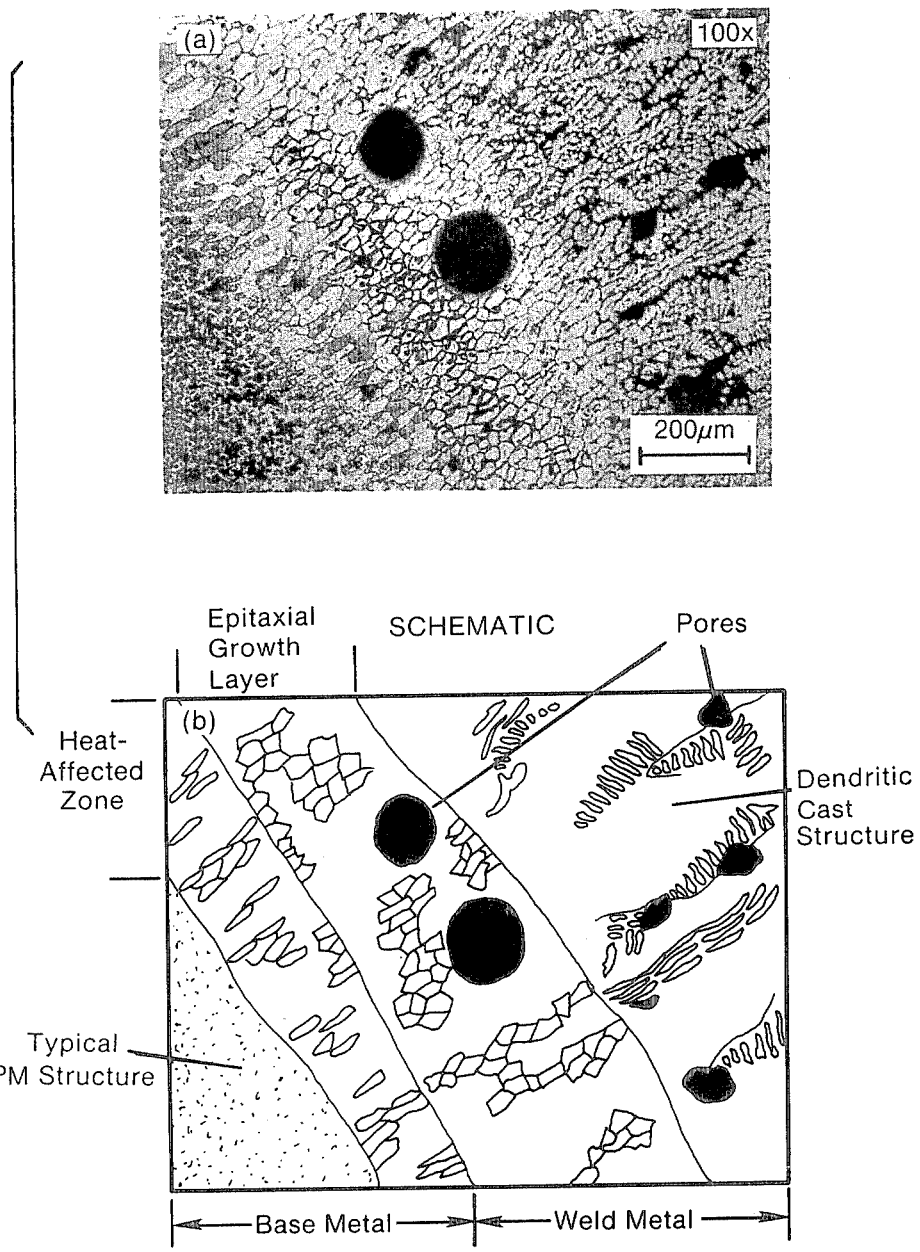
FIG. 1(a) is a photomicrograph of the metal to weld metal interface of a weldment comprising a conventional powder metallurgy 5356 aluminum alloy welded with a conventional 5356 alloy welding rod.
FIG. 1(b) is a schematic illustrating the various regions of said photomicrograph.

As was mentioned previously, the present invention involves using metal-ceramic composites prepared by certain processes in various welding applications such as in welding conventional materials, or in welding these composites themselves. Before describing these welding applications in greater detail, it is necessary to first explain the manners in which these metal-ceramic composites are prepared. The basic process is for the in-situ precipitation of fine particulate ceramics, or intermetallics, such as refractory hard metal borides or aluminides, within metal and alloy systems to produce a metal-ceramic composite having enhanced mechanical properties, such as high elastic modulus, high-temperature stability, and improved wear resistance. However, the process described may also be employed for producing larger particles of the ceramic material in the chosen matrix, up to the point at which such larger particles result in component embrittlement, or loss of ductility, etc. Such improved properties offer weight-savings in stiffness limited applications, higher operating temperatures and associated energy efficiency improvements, and reduced wear in parts subject to erosion, as well as energy efficiency improvements in equipment, such as aircraft, resulting from weight reduction.

Broadly stated, the process involves ceramic forming elements reacting in a solvent metal to form a finely-divided dispersion of the ceramic material in the solvent metal matrix. It has been found that the reaction commences, or is initiated, at a temperature far below the temperature conventionally associated with the reaction sought. The ceramic-forming constituents most easily combine at or about the melting temperature of the solvent metal, and the exothermic nature of this reaction causes a very rapid temperature elevation or spike, which has the effect of melting additional metal, simultaneously causing the further reaction of the ceramic constituents. Alternatively, in systems where the reactive elements have substantial diffusivity in the solid matrix metal, the reaction may be initiated at temperatures well below the melting point of the matrix metal.

Exemplary of suitable ceramic precipitates are the borides, carbides, oxides, nitrides, silicides, aluminides, selenides, sulfides, and germanides. Suitable elements include all of the elements which are reactive to form ceramics, including, but not limited to, transition elements of the third to sixth groups of the Periodic Table. Particularly useful ceramic-forming or intermetallic compound forming constituents include aluminum, titanium, silicon, boron, molybdenum, tungsten, niobium, vanadium, zirconium, chromium, hafnium, yttrium, cobalt, nickel, and iron. Additional elements suitable for inclusion as ceramic constituents include magnesium, carbon, selenium, tantalum, gallium, manganese, germanium, zinc, arsenic, antimony, lithium, beryllium, thorium and the rare earths including scandium, yttrium, lanthanum and the lanthanide series elements such as cerium and erbium.

As the matrix metal, or solvent metal, one may use any metal capable of dissolving or sparingly dissolving the constituents of the ceramic phase, and having a lesser capability for dissolving the ceramic precipitate. Thus, the matrix metal component must act as a solvent for the reaction species, but not for the desired ceramic precipitate. It is to be noted that the matrix metal acts primarily as a solvent in the process, and that the constituents of the ceramic precipitate have a greater affinity for each other than either has for the solvent metal.

Suitable matrix metals include aluminum, gallium, nickel, titanium, copper, vanadium, chromium, manganese, cobalt, iron, silicon, germanium, palladium, rhodium, ruthenium, silver, gold, platinum, magnesium, lead, zinc, tin, tantalum, molybdenum, tungsten, hafnium, niobium, rhenium, zirconium and alloys and intermetallics of such metals. When alloys are utilized, one may retain the beneficial properties of said alloys, and increase the modulus of elasticity, high temperature stability, and wear resistance, although some loss of ductility may be encountered in certain soft alloys. For example, 7075 aluminum alloy, containing about 20 percent by weight titanium diboride, is affected by age-hardening in the same fashion that the 7075 alloy alone is, but exhibits a substantial increase in modulus of elasticity, higher temperature capability, greater high temperature stability, and extremely high wear resistance. Further, the composites of the present invention may be fabricated in conventional fashion, by forging, extruding, rolling, machining, etc.

Varying amounts of ceramic may be incorporated into the composite material, depending upon the end use and the properties desired in the product. For instance, for dispersion strengthened alloys having high modulus, one ma.y utilize a preferred range of from about 1.0 percent by volume to about 15 percent by volume. However, the ceramic volume fraction for dispersion strengthening may be varied considerably, so as to produce a composite with the desired combination of properties, within the range of from about 1 percent by volume up to the point at which ductility is sacrificed to an unacceptable extent. In contrast, cermets of up to about 95 percent or more by volume of ceramic material may be produced. Preferred ranges for cermet materials will, of course, be dependent upon the desired end use. It is possible to effectively tailor the composition to achieve any desired properties by controlling the proportions of the reactant and solvent materials.

Utilizing such procedures, it is possible to prepare "Master Concentrates", containing a ceramic phase, which may be utilized to introduce the ceramic phase into a diluent metal in controlled fashion. Thus, for example, one may prepare a master concentrate of a high percentage of titanium diboride in aluminum, and add metal to achieve a composite having the desired concentration of ceramic. In fact, an ingot of unreacted components, such as titanium, boron, and aluminum, may be utilized as a grain refiner for aluminum. When such an ingot is introduced into the molten aluminum, the reaction produces nuclei for grain refining. A wide range of other metals and alloys can be used to produce the master concentrate for different metallurgical applications.

Three basic reaction modes have been identified for the basic process. In the first mode, the starting materials constitute individual powders of each of the solvent metal and the individual constituents of the ceramic to be formed. For example, one may react a mixture of aluminum, titanium, and boron, to form a dispersion of titanium diboride in an aluminum matrix.

In the second mode, one may react individual alloys of a common metal, one such alloy comprising an alloy of the solvent metal with one of the constituents of the ceramic, and the other comprising an alloy of the solvent metal and the other constituent of the ceramic. As an example, one may react a mixture of aluminum-titanium alloy with aluminum-boron alloy, to form a dispersion of titanium diboride in aluminum. This alloy-alloy reaction route may, in some cases, be relatively slower than the elemental route, yet may offer economic advantages because the alloys utilized can be cheaper than the elemental powders. In this case, the preferred form is that of separately melting master alloys containing the chosen elements and mixing them in the molten state, forming a mass in which the dissolved matrix element acts as a liquid solvent for the constituents of the ceramic.

The third reaction mode constitutes a combination, or intermediate, of the first two modes discussed above. Thus, one may react a premixed alloy containing one reactive species and the matrix metal, with an elemental powder of the second reactive species, such as combining an aluminum-titanium alloy with elemental boron powder. This reaction mode may be relatively more expensive than the alloy-alloy reaction mode, but offers a more rapid reaction, which in turn permits formation of finer grain precipitates than obtainable by the alloy-alloy route. However, the alloy-elemental powder reaction mode could be relatively less expensive, although slower, than the elemental powder mode, in most cases.

Moreover, the three reaction modes may occur in different physical states. Each of the first two basic modes of the solvent assisted reaction may occur in either of two states. The elemental powders can react to form the desired second phase via diffusion of the reactive species through the liquid solvent or in a solid state. Similarly, in the case where two alloys are used, each containing an alloying element constituting a reactive component, the reaction can occur in the liquid state, or in a plasma state achieved by striking an arc between electrodes of the two alloys. The third reaction mode, however, may function in all three states. That is, the reaction of an alloy with an elemental powder may be conducted as a liquid state reaction, a solid state reaction, or in the plasma state.

It is also to be noted that complex compounds, as well as plural ceramic phases, may be precipitated by these three reaction modes. Thus, solvent matrix combinations with complex ceramics such as titanium zirconium boride, may be prepared.

It is particularly to be noted that the prior art teaches that the combination of elemental powders, particularly of a coarse particulate size, would yield intermetallic compounds. In fact, conventional techniques for forming intermetallics involve reacting a mixture of elemental powders of, for example, titanium and aluminum, to form titanium aluminide, and a mixture of elemental powders of boron and aluminum to form aluminum diboride. Thus, one would anticipate that a mixture comprising powders of titanium, aluminum, and boron would yield an aggregate agglomeration of titanium aluminide, aluminum diboride, and possibly, titanium diboride. In contrast, the process disclosed herein provides for the formation of one finely dispersed precipitate in a matrix of the third component. It is important that the ceramic precipitate material is not soluble in the solvent metal, while the constituents of the ceramic, individually, are at least sparingly soluble in the solvent metal. Thus, the exothermic dispersion reaction mechanism depends upon a certain amount of each ceramic forming constituent dissolving and diffusing in the solvent metal, and while in solution (either liquid or solid state), reacting exothermically to form the insoluble ceramic, which precipitates rapidly as a very fine particulate. The solvent metal provides a medium in which the reactive elements may diffuse and combine. Once the initial reaction has occurred, the heat released by the exothermic reaction causes additional diffusion of reactive components in the solvent metal, and drives the reaction to completion.

A temperature trace of a typical reaction, such as the reaction of a mixture of titanium, boron, and aluminum powders, shows a gradual rise in temperature followed by a very rapid rise in temperature as the reaction is initiated, followed by a gradual decrease in temperature once the reaction is completed. The temperature trace then illustrates the solvent assisted initiation of the reaction of the reactive constituents, and the very rapid temperature increase associated therewith. In the course of the reaction, extremely high temperatures may be achieved in very short periods of time. During this time frame, essentially all of the reactive components in the solvent metal react to form the insoluble ceramic, which immediately precipitates.

The cool-down period following initiation of the reaction and consumption of the reactive constituents may be important in achieving very small particle size, and limiting particle growth. It is known that at high temperatures, it is possible for the ceramic particles to grow, e.g. by agglomeration. This should also be avoided, because of the negative effect of large particle sizes on ductility. The cool-down or quenching of the reaction is, in a sense, automatic, since once the ceramic forming constituents are completely reacted, there is no further energy released to maintain the high temperatures achieved. However, one may control the rate of cool-down to a certain extent by control of the size and/or composition of the mass of material reacted. That is, large thermal masses absorb energy, and remain at elevated temperatures for longer periods, thus permitting growth of larger particles, such as may be desired for greater wear resistance, e.g. for use in cutting tools. It is recognized that if it is desired to rapidly cool the reaction mass to an intermediate temperature, one may achieve this by the introduction of a stream of cool inert gas, such as helium. Thus, the temperature may be rapidly reduced from the maximum temperature attained to a temperature where grain growth is minimal. In terms of temperatures that cause coarsening of the particle size, temperatures in the region of 1000° C. are not generally believed to have substantial impact on particle growth. However, at temperatures in the region of 1600° C. and higher, grain growth can occur over extended time periods. For example, silicon nitride may begin to grow at 1600° C., over a period of days, whereas titanium diboride will not begin to exhibit grain growth below about 1800° C. The incidence of particle growth will depend on the particular ceramic phase being formed.

The reaction temperature has generally been found to be relatively close to the melting temperature of the solvent metal utilized in liquid state reactions. For example, in the production of titanium diboride in an aluminum matrix, the reaction proceeds at a temperature around 650° C., or very close to the melting point of the aluminum solvent. It should be noted that in the absence of a solvent metal, the reaction of titanium and boron to form titanium diboride was not observed to proceed below a temperature of about 900°–1200° C., depending upon processing conditions, and generally will produce large crystallites having a particle size at least as large as the starting materials. While one need not actually reach the melting temperature, one must achieve a temperature where substantial diffusion of the reactive species in the solvent metal can occur, either locally or generally. It is observed that, in some cases, as one increases the temperature it is possible for the starting constituents to diffuse into the matrix solvent metal, forming an alloy therewith having a lower melting temperature than the matrix metal, and thus lowering the reaction initiation temperature.

The starting powders must be protected from extensive oxidation due to exposure to the atmosphere, as this will restrict the diffusion of the components into the metal matrix, and the reaction should preferably be carried out under an inert gas to avoid oxidation at high temperatures.

The production of relatively porous composites, containing high concentrations of the ceramic phase, provides a technique for the production of high purity ceramic powders of desired particle sizes. This may be achieved by selective dissolution of the matrix metal, yielding a suspension of ceramic powder in the dissolution medium. If the medium is an appropriate acid or caustic solution, one may then recover the finely divided ceramic powder. If, on the other hand, the dissolution medium is another metal, one may obtain a dispersion of a ceramic phase in a matrix in which it may not be directly precipitated. For example, titanium can be reinforced by precipitating titanium diboride in aluminum, and subsequently dissolving the titanium diboride/aluminum composite in titanium.

As was mentioned previously, one process, hereinafter referred to as the addition process, for forming the subject composite materials comprises providing a substantially molten or liquid mass containing the matrix metal and then adding at least one of the constituents or elements of the desired ceramic material to the molten mass. Upon the addition, the solvent assisted in-situ precipitation reaction is initiated to form and disperse finely divided particles of ceramic material in the metal matrix. Thus, for example, the molten mass could contain one of the constituents of the desired ceramic material, e.g., as preformed alloy, and one or more constituents would subsequently be added. Alternatively, all of the constituents could be added to the molten mass either sequentially or simultaneously. One convenient mode of practicing this process is to compact powders or chips of the unreacted constituents of the ceramic material and then add the compact of constituents to the molten metal mass.

Preferably, the constituent or constituents are added to the molten metal mass along with sufficient solvent metal to allow the reaction to easily proceed. With this procedure, the metal of the molten mass could be different than the added solvent metal and thus need not be a solvent for the constituents.

In practicing the addition process, it is generally advisable to produce a composite material containing at least about 10 weight percent, preferably about 15 weight percent, ceramic material, so as to yield a composite having appreciably improved properties such as increased modulus. If grain refining is all that is required, lower levels of ceramic material may be adequate. Best results are believed to be achieved when concentration of ceramic material in the produced composite material is great enough that the interparticle spacing is one micron or less.

In selecting the constituents and the matrix metal for the composite materials produced by the above-described addition process, it is important that the formed ceramic material have relatively low solubility in the molten mass. Otherwise, significant particle growth in the ceramic material may be experienced for a period of time at temperature, for very fine particles. For most applications of the composite materials, the size of the ceramic particles should be as small as possible, and thus particle growth is undesirable. When the solubility of the formed ceramic material in the molten mass is low, the molten mass with dispersed ceramic particles can be maintained in the molten state for a considerable period of time without growth of the ceramic particles. For example, a molten mass of aluminum containing dispersed titanium diboride particles can be maintained in the molten state at temperatures near the melting point for three to four hours without appreciable particle growth.

An advantage of the addition process is that, if the constituents are carefully added, e.g., a step-wise or incremental addition, the temperature of the molten mass will not change significantly during the course of the addition, and thus potential particle growth of the ceramic particles due to elevated temperatures will be minimized. Such an addition procedure is also advisable from a safety standpoint to prevent the rapid evolution of significant quantities of heat which could cause metal to be splattered or sprayed from the containment vessel. Another advantage is that the exothermic reaction of the constituents in forming the ceramic material occurring in the molten mass creates a mixing effect which is important in dispersing the ceramic material throughout the mass. In addition, by having the mass molten or liquid upon addition of the constituents, the constituents are rapidly heated to reaction temperature. Thus, the formation of fine ceramic particles may be promoted. A further important consideration of this process is that since a molten mass of matrix metal is utilized, the matrix metal need not be formed from powdered metal, a significant saving in material costs.

With certain combinations of ceramic forming constituents and matrix metals, one or more of the constituents may tend to react with the molten matrix metal as the added constituent is heated up to the temperature at which the ceramic forming reaction occurs. This reaction product of the constituent and the matrix metal may be undesirable in the final composite and, in any event, reduces the amount of constituent available for the in-situ ceramic forming reaction. For example, when adding titanium and boron to molten aluminum, titanium aluminide ($Al_3Ti$) and aluminum diboride may be formed as the titanium and boron are heated to reaction temperature. When titanium reacts with aluminum, the formed titanium aluminide, if present as large plates, may be deleterious in the final composite and results in a lower than desired concentration of titanium diboride.

To help prevent the formation of such undesirable reaction products, the added constituent or constituents may be provided with a thin barrier layer to protect the constituents from contact with the molten matrix metal until the constituents reach the reaction initiation temperature at which the formation of the desired ceramic material begins. The composition of such a barrier layer would, of course, depend upon the particular materials being utilized and should be selected so that undesirable reaction products are not produced. Generally, the barrier layer should prevent or at least retard wetting of the added constituents by the molten matrix metal. In the formation of composites such as titanium diboride in aluminum, boron nitride, glass frits and polymeric materials such as halogenated polyolefins may be suitable for the barrier layer.

Alternatively, the undesirable compounds formed from the reaction of one constituent and the matrix metal can be essentially eliminated in some instances by the addition of more of the other constituent. For example, the titanium aluminide formed in the titanium diboride-aluminum composite can be removed by adding additional boron to the molten mass. The boron can be in the form of elemental boron, boron alloy or boron halide. Such a boron addition also provides the benefit that any free titanium, which can adversely effect the viscosity of the melt for casting operations, is converted to titanium diboride.

As was also previously mentioned, one can prepare master concentrates of the subject composite materials and thereafter dilute the concentrate to yield the desired composite material. This process is hereinafter referred to as the master process. Generally, the master process comprises preparing a reactant mixture of a metal and ceramic forming constituents and then heating to produce the in-situ reaction as described herein to form fine particles of ceramic material dispersed in the metal matrix. Alternatively, the initial metal-ceramic composite can be formed by the previously described process of adding the constituents to a molten mass of matrix metal. The concentration or loading of ceramic material is generally rather high, e.g., at least 10 weight percent, preferably 15 percent, up to 80 or 90 weight percent or more of ceramic material in the resultant composite. Generally, concentrations below about 10 weight percent are not economical for further dilution, and concentrations in excess of about 90 percent are not advisable as the reaction may become too violent and particle growth may be experienced. After solidification, preferably the composite is comminuted to the desired size, or alternatively, the composite can be cast to any appropriate size. Alternatively, the reaction melt is reduced to powder by methods such as spray atomization and the like.

The next step in the master process is dilution of the concentrate by additional matrix metal which can be the same or different from the matrix metal used in the in-situ precipitation reaction. Generally, this dilution may be accomplished by preparing a melt of the additional matrix metal and adding the composite to the melt, or alternatively, placing both the composite material and the additional matrix metal in solid form in a vessel and then heating to a temperature such that the additional matrix metal melts. Dispersion of the ceramic material in the melt is facilitated by melt agitation generated by mechanical stirring, gas bubbling, ultrasonic energy and the like. While in the molten state, various clean-up techniques such as the use of fluxes, scavengers and the like can be employed to remove impurities such as oxides from the melt. Once dispersion of the ceramic material is complete, the melt may be filtered and is then solidified by conventional techniques such as chill casting to yield very low porosity composite.

In preparing such master concentrates, degassing of the powders of the reactant mixture may not be necessary, and in fact it may be advantageous not to degas the powders, since a porous product tends to be formed in some systems which aids in the subsequent dilution by molten metal. It may be desirable in some instances to incorporate a porosity enhancer such as a low boiling point metal, e.g., magnesium, in the initial reactant mixture, the enhancer volatilizing during the in-situ reaction thereby increasing the porosity of the resultant composite.

The use of master concentrates, particularly those having high loadings of ceramic material, is advantageous since one can simply make one batch of composite material and make a wide variety of composites having different ceramic loadings. Another advantage is that the additional matrix metal used to form the melt need not be in powder form thereby saving considerably on raw material costs. Additionally, with the master concentrate procedure, it is possible to form the ceramic material in a matrix metal which is conducive to the formation of particles of a desired morphology and thereafter incorporate the particles in a matrix metal in which such particles cannot be produced by the in-situ precipitation reaction.

An important characteristic of the metal-ceramic composite materials made by the above processes is their capability of easily forming welded joints of high strength using conventional welding techniques. In one embodiment, the composite material itself is used as the weld material. Thus, for example, the metal-ceramic composite materials can be formed into consumable welding rods, electrodes and wires and the like and used as a filler or weld material in welding bodies composed of a wide variety of metals, metal alloys and metal-ceramic composites including the composite materials made by the process described herein, as well as metal-ceramic composites reinforced with filaments such as carbon, boron and like filaments. Preferably, the metal of the bodies to be welded is selected from conventionally weldable metals such as aluminum, zinc, magnesium, copper, lead, nickel, chromium, iron, titanium, cobalt, tantalum, tungsten, molybdenum, uranium, zirconium, hafnium, niobium, rhenium and alloys and intermetallics of such metals. Welding processes in which the composite materials are suitable filler or weld materials include conventional arc, resistance, gas, laser, transient liquid phase (TLP) and electron beam type welding processes. Particularly suitable welding processes for using the subject composite materials are electric arc welding type processes wherein a refractory metal such as tungsten is used in the arc forming electrode and the arc is shielded by an inert gas such as helium or argon.

Welding rod composed of the metal-ceramic composite materials according to the invention may be made by a wide variety of processes. Generally, any of the methods set forth herein for conducting the in-situ ceramic forming reaction are suitable. Thereafter, the reacted material may be formed into a welding rod shape by various processes including casting and mechanical working and shaping by compacting, rolling, extruding, machining and the like.

In another embodiment, welding of bouies can also be accomplished by utilizing the previously described ceramic forming in-situ reaction to produce a molten weld or filler material of a metal-ceramic composite material which, upon solidification, joins the bodies together. In one mode, the filler wire or rod for welding can be composed of two alloys, one alloy containing a base metal and one constituent of the ceramic material to be formed in-situ and the other alloy containing another ceramic forming constituent. As an example, the wire or rod can be composed of two reactive alloys such as an aluminum-titanium alloy and an aluminum-boron alloy containing a stoichiometric amount of boron to completely form titanium diboride under ceramic forming conditions. In some cases, an excess amount of either ceramic forming constituent can be used to generate solid solution strengthening in the composite material.

In another mode, compacted powders of the constituents for the in-situ ceramic forming reaction and the solvent metal might be used as the filler rod or wire. Thus, for example, a welding rod might be fabricated from compacte powders of aluminum, titanium and boron. Further, powders or filaments of the ceramic forming constituents could be wrapped in a deformable sheet such as a foil composed of a solvent metal to produce a weld wire or rod. Filaments of the ceramic forming constituents could also be twisted together with a filament of the solvent metal. It is not necessary that the ceramic forming constituents be introduced for reaction into the weld formation area as solid materials, as they can be supplied also in gaseous form. Thus, for example, when forming titanium diboride ceramic particles in a suitable metal matrix using a gas shielded arc welding process, it is possible to have the welding rod contain titanium and have the gas include a reactive boron compound such as boron trichloride. When these constituents are introduced into the arc, the boron will react with the titanium to form titanium diboride.

During the in-situ precipitation reaction for forming a finely divided ceramic dispersed in the solvent metal, the solvent metal becomes fluid and wets adjacent bodies, and upon solidification, welds the bodies together. An advantage of the use of the in-situ precipitation reaction for welding applications is that welds can be formed in inaccessible or blind locations. For example, filler material containing unreacted ceramic forming constituents may be placed adjacent to one body to be welded and then a joint cavity containing the filler material formed by locating another appropriately shaped body adjacent to the first body. The filler material is then subjected to conditions such that the in-situ precipitation reaction occurs and the welded joint is thus formed.

A wide variety of metal containing materials can be welded using composite materials formed in accordance with processes herein as it is not necessary that the final composition of filler material be the same as that of the bodies being welded. Therefore, the filler material composition can be tailored for the application of the welded body, e.g., more or less ceramic material in the resultant weld composite to optimize one or more of the following properties: strength, stiffness, hardness, temperature stability, and fatigue resistance. As previously mentioned, the bodies to be welded can be produced by the in-situ ceramic forming processes disclosed herein or can be conventionally cast or wrought, or can be formed by powder metallurgy. The preponderance of weldments in commercial use are largely steel or iron based structures, and are well suited for fabrication using the methods of the present invention with appropriately chosen weld rod or filler materials prepared by the processes described herein.

In selecting the composition for the filler material for welding bodies, it is preferable that none of the bodies contain a material, such as element, compound or the like which might adversely affect the formed weld under the elevated temperature conditions of welding. For example, the body could possibly contain a material which tends to cause the ceramic particles of the weld to agglomerate together such that the weld may not have uniform properties and less than full advantage is taken of the dispersion strengthening characteristics of the ceramic particles. An example of such agglomeration has been noted when welding with an aluminum based composite containing about 10 weight percent titanium diboride particles which included a minor (e.g., 4 percent) proportion of silicon. Thus, the inclusion of silicon in aluminum containing bodies or filler material should be avoided. While such agglomeration of the ceramic particles may lead to less than optimum characteristics, the formed weld may still however be more than satisfactory for may applications.

In certain situations, it may, however, be desirable to select a filler material which contains a constituent which is reactive with a constituent contained in the body to be welded. For example, when welding a body containing boron or carbon with a filler material containing either unreacted titanium and boron for forming titanium diboride in situ or prereacted titanium diboride, it may be advantageous to include excess titanium in the filler material which will react with the boron or carbon contained in the body under the conditions of welding. As a result, additional dispersed particles, e.g., titanium carbide or titanium diboride, are created in the body in and adjacent to the weld joint thus avoiding phase discontinuities. The weldability of such metal-ceramic composites is thereby enhanced over that obtainable with conventional welding methods.

An excess of one of the ceramic forming constituents may also be included as a fluxing means for removing oxides or other materials from the surfaces of the bodies being welded. For example, excess titanium may be included in the filler material to strip an oxide film from metal containing bodies.

The welding of bodies with metal-ceramic composite materials according to the invention, like conventional welding with conventional materials, should be conducted with the welding surfaces of the bodies free from dirt, grease and other sources of contamination which could deleteriously affect the formed weld. In addition, the bodies to be welded should, in some instances, be degassed so as to avoid introducing undesirable porosity in the weld. Degassing tends to be more important with bodies made by powder metallurgical procedures.

FIGS. 1(a) and 2(a) are photomicrographs which show parent metal to weld metal interfaces in a powder metallurgy 5356 aluminum alloy welded respectively with conventional 5356 weld rod, and with 5356 alloy dispersed with $TiB_2$, manufactured according to the process described herein. FIGS. 1(b) and 2(b) constitute schematics of these photomicrographs, more clearly illustrating the grain structures of the materials in the weld interfaces.

Starting from the bottom left hand corner of FIG. 1(b) and working towards the top right, the first region shows the normal fine grained structure of the 5356 PM alloy. The next layer is the heat affected zone, marked by oriented grain growth in the direction of heat transfer. The remaining two thirds of the photograph is the weld metal comprising two distinct areas. The first is an epitaxial growth layer representing the initial solidification of the filler material adjacent to the parent body. This layer is relatively large grained and conforms to the crystallography of the outermost grains in the heat affected zone. Finally, the bulk of the solidified filler is made up of the typical dendritic networks seen in most cast metals. This microstructure is poor with regard to strength due to the compositional and structural inhomogeneity of the dendritic region. In addition, it is known that the oriented epitaxial grains facilitate crack growth which then moves into the base metal.

Figure 2:
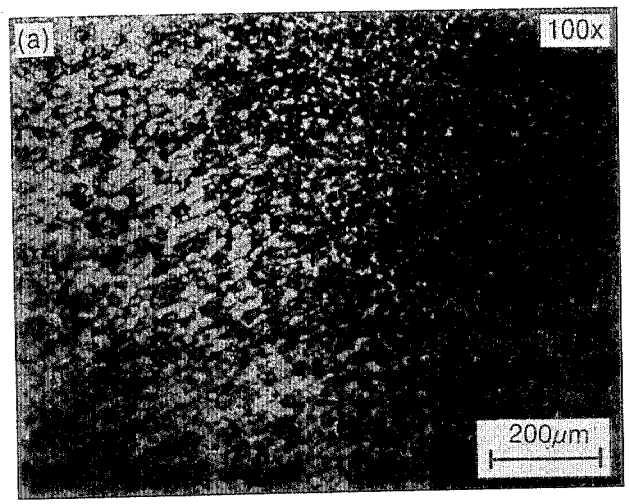
FIG. 2(a) is a photomicrograph of the metal to weld metal interface of a weldment comprising a conventional powder metallurgy 5356 aluminum alloy welded with a 5356 alloy welding rod having TiB$_2$ dispersed therein in accordance with the process described herein.
FIG. 2(b) is a schematic illustrating the various regions of said photomicrograph.
Figure 2:
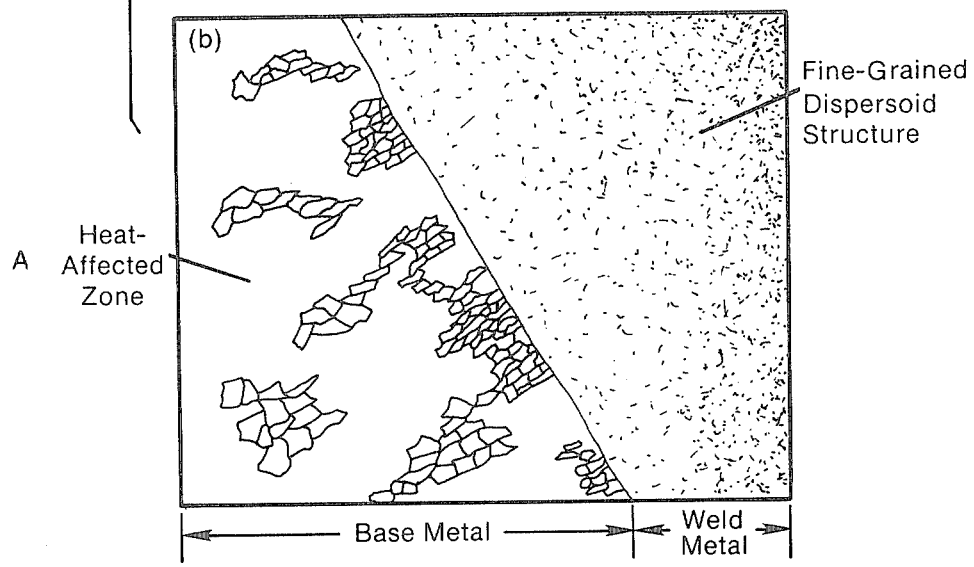

In FIG. 2 there are only two regions, as clearly indicated by FIG. 2(b). The first, at the bottom left, is the normal heat affected zone structure of the 5356 PM alloy. In this case, however, the weld metal manufactured according to the process described herein shows substantial uniformity from the interface with the parent metal outwards. The filler is homogeneous, fine grained and contains a uniform dispersion of $TiB_2$. This combination of properties is extremely important for strength and modulus, and should be contrasted with the inhomogeneities in the conventional weld filler material shown in FIGS. 1(a) and 1(b).

The produced weld does not show particle coarsening and thus change in properties upon repeated heating. In contrast, conventional welding materials coarsen and lose fracture toughness unless special additives are provided.

In all of the above-described applications of the subject metal-ceramic composites as the weld or filler materials for welded joints and the like, the resultant joints are generally characterized by physical properties that are essentially equivalent to those of the metal-ceramic composite itself, whereas in conventional welds, it is common for the resultant joints and heat affected zones to exhibit grain growth, loss of fracture toughness, and consequent loss of strength. Thus the welds of the present invention have good particle dispersion, fine grain size, often on the order of one micron, high strength, high modulus, and retention of the advantageous uniform dispersoid distribution of the original material, a characteristic generally not found in composite materials used in welding applications which often times experience dispersoid segregation upon resolidification. An example of this type of segregation can be observed in welds made with material known as thoria dispersed nickel (TD nickel), which shows platelike agglomerations of the thoria dispersoid and consequent weakness at the weld joint. More specifically, the formed weld material of this invention exhibits higher modulus than conventional welding materials. While this characteristic is highly advantageous in its own right for producing stiff structures, it may also enable the weld to be applied between thinner bodies than otherwise, the weld thus functioning as a reinforcing stiffener. Similarly, welds in the form of beads applied to the surface of thin or low modulus sheet material may be used to stiffen the structure.

Another significant advantage realized by using the composite materials produced by the disclosed processes in welding type applications is that a weld can be made in fewer passes, resulting in less total heat input and lower temperatures, yet the resultant weld will have high strength. Thus, bodies which cannot be easily welded by conventional means such as, for example, a composite of silicon carbide in aluminum, due to detrimental effects such as unwanted reactions experienced at welding temperatures, may potentially be welded using the subject composite materials without such effects. In this instance where a metal matrix body is being welded, there is an additional benefit realized in that there is no phase discontinuity and consequent weakness at the interface between the weld and the body. Lack of grain growth due to the fine and stable dispersion also allows multipass welding procedures. Moreover the produced weld does not show particle coarsening and thus change in properties upon repeated heating. In contrast, conventional welding materials coarsen and lose fracture toughness unless special additives are provided.

The high strength characteristics of the formed weld are particularly advantageous in those welding applications where conventionally the weld is formed between two bodies and then the portions of the bodies nonadjacent to the weld are machined away to reduce weight. By using the metal-ceramic composite materials of the invention as the filler material in such weld applications, the weld itself is stronger and thus the weld joint need not be as thick to achieve the same strength. In addition, the higher strength characteristics of the composite materials used in forming a weld enable a weld of a comparable strength to be accomplished with less material, thus reducing the number of welding passes necessary, and the total energy required, thereby lowering the ultimate temperature attained and potentially reducing the heat affected zone.

Although the above discussion of welding applications has focused primarily on welding two or more bodies together, it is contemplated by the present invention that the metal ceramic composites disclosed herein can be welded onto a single body of metal containing material so as to reinforce the body. Thus, for example, the composites can be welded onto a body to provide stiffening ribs, to repair damage caused by wear, erosion, corrosion and the like, to provide protective wear resistant coatings, and to change surface characteristics. Examples of bodies which can be welded in these manners include tank treads, ship propellers, helicopter blades, drill bits and pipe, and drive sprockets for heavy machinery such as bulldozers.

Another important feature of metal-ceramic composite materials prepared according to the processes disclosed herein is their capability of being welded by conventional welding techniques and materials, as well as by the subject composite materials, as was discussed previously. In either regard, this capability may be conferred on the composite by proper selection of the dispersed particles relative to the matrix material such that they are inert to each other at the elevated temperatures encountered during welding procedures, and by proper choice of particles to achieve wetting by the matrix material, which tends to eliminate segregation effects.

The metal-ceramic composite materials of the processes disclosed herein can be welded by conventional techniques such as, for example, arc welding, metal inert gas (MIG), plasma welding, electron beam welding, laser welding and the like. Suitable filler materials for forming the weld can include metals, metal alloys and metal-ceramic composites. A body of the subject composite material can be joined by welding to one or more like bodies or one or more bodies of different composition such as bodies of metals, metal alloys, or metal-ceramic composites. Preferably, the metal of the body of different composition to be welded to the composite material is selected from the group consisting of aluminum, zinc, magnesium, copper, nickel, chromium, iron, titanium, cobalt, and alloys, intermetallics and composites of such metals.

Examples 1 and 2 illustrate the precipitation of fine particles of titanium diboride in aluminum by powder-powder mode reactions, in the liquid state and in the solid state.

EXAMPLE 1

A mixture of 34 percent by weight of titanium powder, 16 percent by weight of boron and 50 percent by weight of aluminum was isostatically compacted to 38,000 pounds per square inch. The compacted artifact was then heated in a furnace set at a temperature of 800° C. Upon reaching approximately 670° C., a rapid increase in temperature to approximately 1250° C. was noted. The rate of increase in temperature was very rapid (greater than 900° C. per minute) followed by a fast cool down rate of approximately 400° C. per minute. On subsequent examination the sample was found to contain a fine dispersion (0.1–3 microns) of titanium diboride particles in an aluminum matrix.

EXAMPLE 2

A mixture of 20.5 percent titanium, 9.5 percent boron and 70 percent by weight cobalt was isostatically pressed to 40,000 pounds per square inch and heated in a furnace. A highly exothermic reaction occurred at 800° C., with a temperature rise to about 1600° C. Subsequent X-ray analysis identified the presence of titanium diboride in a cobalt matrix. It was shown here that if sufficient diffusion of the reactive species can occur, the initiation temperature can be below the melting point of the matrix metal, which in this case is 1495° C., and the reaction may initiate below the melting point of the matrix metal.

The alloy-alloy reaction, in the liquid state, is exemplified by Examples 3 and 4, described below.

EXAMPLE 3

Two separate aluminum alloys, one containing 10 percent titanium, and the other 4 percent boron, by weight, were placed in an alumina crucible and heated to 1400° C. for one hour under an argon atmosphere. Mixing of the alloys occurred through diffusion and thermal effects. The experiment was performed at 1400° C. to ensure that all of the titanium and boron were dissolved, thereby allowing the titanium diboride to fully precipitate, being considerably less soluble than the individual elements. Subsequent SEM/EDS analysis of the metal matrix composite produced identified a submicron $TiB_2$ dispersion in the aluminum matrix. While this experiment was intended to completely dissolve the titanium aluminide and aluminum boride such that all the titanium and boron were held in solution in the aluminum, it was recognized that because of its limited solubility titanium diboride would precipitate at any temperature above the melting point of the solvent metal, even if not all of the alloys were dissolved.

EXAMPLE 4

To support the contention that it was not necessary to fully dissolve the titanium and boron in the alloys, three equivalent experiments to Example 3 were performed, except that the maximum temperatures achieved were limited to 1200° C., 1000° C. and 800° C. respectively. As in Example 3 finely dispersed $TiB_2$ particles were observed in the aluminum matrix, in all cases.

The following Example 5 describes the production of aluminum/titanium diboride composites by alloy-alloy reaction, in the plasma state.

EXAMPLE 5

In this example the reaction is achieved by striking an arc between two electrodes, each containing the metal matrix and one of the reactive species, in a closed vessel. The relative position of the electrodes is adjusted to achieve the passing of the arc. The said electrodes may also be rotated as to achieve even melting. Atomizing the homogenized molten metal into powder can be achieved in air, but is preferably performed in a non-reactive atmosphere such as an inert gas or a vacuum. Alternatively, the molten metal may be collected in a heated container placed below the arc to obtain an ingot.

The reaction between the ceramic constituents within the arc yields a ceramic compound which is mixed with the matrix metal. Due to the very rapid heat up and cool down rates associated with this process, a very fine distribution of ceramic particles in the metallic matrix is achieved. Striking an arc in the above manner between two electrodes, one of which contains aluminum and titanium and the other aluminum and boron, results in the formation of a fine dispersion of titanium diboride in a molten aluminum droplet which solidifies as it drops through the inert gas. The powder thus produced can be subsequently processed by conventional powder metallurgical techniques. In a different variant of this process, the molten metal droplets are collected in a heated crucible to produce an ingot for conventional metal working operations. In yet another variant the droplets are collected on a chilled rotating drum to produce metal-ceramic flakes.

The following example teaches the influence of amorphous boron on the particle size of titanium diboride precipitated in an aluminum matrix.

EXAMPLE 6

An identical mixture (but for the use of amorphous boron instead of crystalline boron) as that described in Example 1 was prepared (i.e. approximately 34 percent by weight of titanium, 16 percent by weight of boron and 50 percent by weight of aluminum), compacted, and heated in a furnace. At a temperature of about 620° C., a rapid exotherm was noted. Subsequent examination revealed the presence of very fine titanium diboride particles in an aluminum matrix.

The high concentration composite prepared in either Example 1 or Example 6 is suitable for use as a master concentrate for subsequent dilution to achieve dispersion hardening of metal/alloy systems.

The following examples teach the use of one matrix solvent to induce precipitation in a second, higher melting point matrix.

EXAMPLE 7

A mixture of 16 percent by weight of aluminum, 56 percent by weight of chromium, 20.6 percent by weight titanium and 9.4 percent by weight of boron was compacted and subsequently heated in a furnace. On attainment of a temperature of about 620° C., a rapid reaction occurred, resulting in a temperature increase to over 800° C. and melting of the chromium matrix. The temperature-time curve showed a double peak, indicating an exothermic reaction in aluminum (which typically occurs between 600–680° C.) and a subsequent reaction in the chromium. The lower melting matrix therefore acted as a "low temperature initiator" for the reaction, which released heat and induced further reaction in the higher melting compound. Titanium diboride in a matrix of chromium-aluminum alloy was identified in the composite produced.

EXAMPLE 8

A mixture of 20.6 percent by weight of titanium, 9.4 percent by weight boron and 70 percent by weight of chromium was compacted to 40,000 pounds per square inch, and then heated in a furnace. A rapid exothermic reaction was noted at approximately 880° C. This temperature is 260° C. above that at which the same proportions of titanium and boron react when 20 percent of the matrix is made up of aluminum. As in the case of Example 7, titanium diboride was identified by X-ray analysis.

EXAMPLE 9

An experiment was conducted whereby zirconium diboride was precipitated in a matrix of copper. A mixture of approximately 24 percent zirconium, 11 percent boron, and 65 percent copper powders by weight was compacted, and, then heated in a furnace. On attainment of a temperature of 830° C., rapid reaction occurred to a temperature maximum of about 970° C. Subsequent X-ray and SEM analysis showed the presence of zirconium diboride in a copper matrix.

EXAMPLE 10

An experiment was conducted, whereby molybdenum disilicide was precipitated in an aluminum matrix. A mixture of approximately 7.5 percent silicon, 12.5 percent molybdenum, and 80 percent aluminum powders by weight was compacted and subsequently heated in a furnace. On attainment of a temperature of approximately 640° C., a sudden exotherm was noted. Subsequent X-ray. and SEM analyses confirmed the presence of molybdenum disilicide in an aluminum matrix.

EXAMPLE 11

A mixture of 20.4 percent titanium, 9.6 percent boron and 70 percent by weight of lead was compacted to 40,000 pounds per square inch and then heated to 450° C. No exotherm was noted and subsequent X-ray. analysis identified only the unreacted elemental powders. This behavior illustrates, as others have shown, that there is no solubility of boron in lead and thus no diffusion of boron in the lead can occur to react with the titanium. In contrast to such behavior, a silicon, titanium and lead mixture does produce titanium disilicide in lead, as both silicon and titanium have a finite solubility in lead which enables diffusion and reaction to occur.

EXAMPLE 12

A mixture of nickel, aluminum, titanium and boron in the stoichiometric proportions for the formation of nickel aluminide (Ni3Al) and titanium diboride (TiB2), i.e. 10 percent by weight aluminum, 62 percent by weight nickel, 19 percent by weight titanium and 9 percent by weight boron, were compacted to 40,000 pounds per square inch, and then heated in a furnace. Upon reaching 620° C., a rapid exotherm was noted which, subsequent analysis by X-ray diffraction and scanning electron microscopy identified as resulting from the formation of titanium diboride particles in a nickel aluminum matrix. It was evident from this experiment that a ceramic phase, e.g. titanium diboride could be precipitated in a intermetallic phase, e.g. nickel aluminide, provided the affinity of the ceramic-forming species for each other is greater than either has for the two elements making up the intermetallic matrix.

The following example teaches the preparation of a composite material by direct addition of the ceramic forming constituents to a molten mass of matrix metal.

EXAMPLE 13

A 2014 aluminum alloy was loaded in a crucible and melted to a completely molten mass. A compacted but unreacted mixture containing about 41.4 percent weight percent titanium, about 18.6 weight percent boron and remaining aluminum was prepared from powders having a particle size greater than 20 microns. The compacted mixture was then added to the molten aluminum mass. A rapid exothermic reaction occurred which resulted in the formation of about 23 weight percent titanium diboride dispersed in the aluminum alloy. Subsequent SEM analysis of the solidified composite material determined the particle size of the titanium diboride dispersed to be less than 1 micron, considerably smaller than the particle size of the starting titanium and boron constituents.

The following example teaches the preparation of a master concentrate and its subsequent dilution by additional matrix metal.

EXAMPLE 14

Titanium, amorphous boron and aluminum metal powders were combined in the appropriate proportions to produce two titanium diboride - aluminum composites having a titanium diboride concentrations of about 23 weight percent and 60 weight percent, respectively. After conducting the in-situ precipitation reaction, SEM analyses of the resultant composites indicated a size range for the titanium diboride particles of less than 1 micron. Since the initial powders were not degassed prior to the precipitation reaction, the porosity of the resultant composites was relatively high. The composite with 23 percent titanium diboride was then mixed with an equal weight of aluminum and then heated to about 750° C. so as to melt the aluminum. While stirring the mixture, the composite concentrate readily dissolved in the aluminum yielding a composite containing about 12 weight percent of the titanium diboride ceramic phase.

A melt of 7075 aluminum alloy was then prepared and the composite containing 60 weight percent titanium diboride was immersed therein. The composite was readily wet by the molten metal alloy and was easily mixed by mechanical stirring. The resultant composite, containing about 15 percent titanium diboride in aluminum alloy matrix, was then cast in a conventional manner. Subsequent SEM analyses confirmed a uniform distribution of titanium diboride particles throughout the matrix and approximately the same size particles as those observed in the composite concentrate, i.e., there was no evidence of particle growth during casting. In addition, there was no indication of agglomeration of the titanium diboride particles and the residual porosity of the as-cast composite was less than 1 percent.

Additional experiments were conducted to produce a variety of metal-ceramic composites as set forth in Table II which follows.

TABLE II

| Ceramic Phase (wt %) | Matrix | Reactants (wt %) | Initiation Temp. °C. | Maximum Temp. °C. | Particle Size (um) |
|---|---|---|---|---|---|
| TiB2-100 | None | Ti-69, B-31 | No Reaction up to 1200° | | |
| TiB2-95* | Al | Ti-65.6, B-29.4, Al-5.0 | 580 | 730 | |
| TiB2-90 | Al | Ti-62, B-28, Al -10 | 580 | 1120 | |
| TiB2-80 | Al | Ti-55.2, B-24.8, Al-20 | 590 | 1625 | 1-3 |
| TiB2-60 | Al | Ti-41.4, B-18.6, Al-40 | 680 | 1450 | 1-3 |
| TiB2-50 | Al | Ti-35, B-15, Al-50 | 780 | 1488 | 1-5 |
| TiB2-40 | Al | Ti-27.6, B-12.4, Al-60 | 680 | 1380 | |
| TiB2-32 | Al | Ti-22, B-10, Al-68 | 780 | 1200 | 1-5 |
| TiB2-30 | Al,Mg | Ti-20, B-5, Mg-5, Al-70 | N/A | N/A | 0.1-5 |
| TiB2-21 | Al,Zn,Mg,Cu | Ti-14.5, B-6.7, Zn-6, Mg-5, Cu-1, Al-68 | N/A | N/A | 0.1-5 |
| TiB2-60 | Al—Mg | Ti-41.4, B-18.6, Al-Mg-40 | 610 | 1350 | 1-2 |
| TiB2-47.5 | Al—Mg,Zn,Cu | Ti-33, B-14.5, Zn-3.2, Cu-0.5, Al—Mg-48.8 | 610 | Thermocouple Failed | |
| TiB2-28 | Al—Mg,Zn,Cu | Ti-19.3, B-8.8, Zn-5.6, Cu-0.9, Al—Mg-65.4 | 600 | 905 | 1.0 |
| TiB2-22 | Al—Mg,Zn,Cu | Ti-14.5, B-7.1, Zn-6, Cu-1, Al—Mg-71.4 | N/A | N/A | 0.1-2 |
| TiB2-21 | Al—Mg,Zn,Cu | Ti-14.6, B-6.8, Zn-6, Cu-1, Al—Mg-71.6 | 680 | 1000 | 0.1 |
| Zr5Si3-30 | Al | Zr-18.6, Si-11.4, Al-70 | 570 | 870 | |
| ZrB2-26 | Al | Zr-21, B-5, Al-74 | N/A | N/A | 0.5-5 |
| ZrB2-24 | Al,Mg | Zr-19, B-5, Mg-7, Al-69 | N/A | N/A | 0.1-1.5 |
| Zr5Si3-35 | Al | Zr-23.5, Si-10.5, Al-66 | 570 | 870 | |
| MgB2-30 | Al | Mg-15.8, B-14.2, Al-70 | No Reaction | | |
| MoSi2-20 | Al | Mo-12.6, Si-7.4, Al-80 | N/A | N/A | 0.01-5 |
| MoB2-27 | Al | Mo-22, B-5.4, Al-73 | N/A | N/A | 0.01-3 |
| MoB2-25 | Al,Mg | Mo-20, B-5, Mg-7, Al-68 | N/A | N/A | 0.01-3 |
| WC-30 | Al | W-28.2, C-1.8, Al-70 | 640 | 700 | 0.15-1 |

TABLE II-continued

| Ceramic Phase (wt %) | Matrix | Reactants (wt %) | Initiation Temp. °C. | Maximum Temp. °C. | Particle Size (um) |
|---|---|---|---|---|---|
| $Cr_3C_2$-30 | Al | Cr-24.4, C-5.6, Al-70 | 630 | 720 | |
| $VSi_2$-60 | Al | V-28.6, Si -31.4, Al-40 | 820 | 1300 | |
| VC-60 | Al | V-48.6, C-11.4, Al-40 | 780 | 860 | |
| $VB_2$-60 | Al | V-42.2, B-17.8, Al-40 | 700 | 860 | 0.25-1** |
| $TiB_2$-80 | Cu | Ti-55.2, B-24.8, Cu-20 | 580 | 1290 | 0.1-1.5 |
| $TiB_2$-30 | Cu | Ti-20.6, B-9.4, Cu-70 | 820 | 1320 | 0.1-2.0 |
| $TiB_2$-30 (Hot Pressed) | Cu | Ti-20.6, B-9.4, Cu-70 | 780 | 1240 | 0.1-0.5 |
| $TiB_2$-23 | Cu,Zn | Ti-15.8, B-7.2, Zn-23.1, Cu-53.8 | 820 | 1190 | 0.5 |
| SiC-60 | Cu | Si-42, C-18, Cu-40 | N/A | N/A | |
| $ZrB_2$-30 | Cu | Zr-24.2, B-5.8, Cu-70 | 830 | 870 | 0.2-1 |
| $ZrB_2$-60 | Cu | Zr-48.6, B-11.4, Cu-40 | 870 | 1100 | |
| $ZrSi_2$-30 | Cu | Zr-18.6, Si-11.4, Cu-70 | 770 | 940 | 0.05-0.5 |
| $Cr_3C_2/Cr_7C_3$-60 | Cu | Cr-52, C-8, Cu-40 | N/A | N/A | |
| $Mo_2C$-60 | Cu | Mo-56.4, C-3.6, Cu-40 | N/A | N/A | |
| $MoSi_2$-30 | Cu | Mo-19, Si-11, Cu-70 | 760 | 780 | 0.1-0.5 |
| VC-60 | Cu | V-48.6, C-11.4, Cu-40 | 1020 | 1140 | |
| $VB_2$-60 | Cu | V-42.2, B-17.8, Cu-40 | 1020 | 1230 | |
| $AlTi_2$-60 | Cu | Ti-50.6, Al-9.4, Cu-40 | 510 | 830 | |
| $TiB_2$-30 | Cr | Ti-20.6, B-9.4, Cr-70 | 880 | |1100 | |
| $TiB_2$-30 | Fe | Ti-20.7, B-9.3, Fe-70 | N/A | N/A | 0.1-1.0 |
| $TiB_2$-30 (Hot Pressed) | Fe | Ti-20.7, B-9.3, Fe-70 | 1150 | 1300 | 0.1-0.5 |
| $Mo_5Si_3$-30 | Fe | Mo-19, Si-11, Fe-70 | 1060 | 1130 | |
| $TiB_2$-30 | Mg | Ti-20.7, B-9.3, Mg-70 | N/A | N/A | 0.1 |
| $TiSi_2$-32 | Mg | Ti-14.6, Si-17.1, Mg-68.3 | 350 | 490 | |
| ZrC-60 | Ni | Zr-47.6, C-12.4, Ni-40 | N/A | N/A | |
| $TiB_2$, $Ti_2Ni$-60 | Ni | Ti-20.6, B-9.4, Ni-70 | N/A | N/A | |
| TiC-60 | Ni | Ti-48, C-12, Ni-40 | 1000 | 1370 | |
| $TiB_2$-30 | Cr—Al | Ti-20.6, B-9.4, Al-14, Cr-56 | 620 | 1400 | |
| $TiB_2$-30 | Co—Al | Ti-20.6, B-9.4, Al-14, Co-56 | 590 | 1080 | 0.1-1.5 |
| $TiB_2$-30 | Ni—Al | Ti-20.6, B-9.4, Al-14, Ni-56 | 600 | 1600 | |
| $TiB_2$-30 | Co | Ti-20.6, B-9.6, Co-70 | 800 | 1400 | |
| TiC-60 | Co | Ti-48, C-12, Co-40 | 1050 | |1450 | 0.1-0.3 |
| $TiSi_2$-60 | Co | Ti-27.6, Si-32.4, Co-40 | N/A | N/A | |
| $ZrB_2$-60 | Co | Zr-48.6, B-11.7, Co-40 | 900 | |1500 | |
| $ZrSi_2$-60 | Co | Zr-37.2, Si-22.8, Co-40 | 930 | Thermocouple failed | |
| $Mo_5Si_3$-60 | Co | Mo-37.8, Si-22.2, Co-40 | 970 | 1070 | |
| WC-60 | Co | W-56.4, C-3.6, Co-40 | N/A | N/A | |
| $WSi_2$-60 | Co | W-46.0, Si-14.0, Co-40 | 980 | 1080 | |
| $TiB_2$-30 | MarM322*** | Ti-20.6, B-9.4, MarM-70 | 920 | 1330 | |
| $TiB_2$-40 | 316 Stainless+ | Ti-26.4, B-13.6, 316-60 | 960 | Thermocouple failed | |
| $TiB_2$-40 | 304 Stainless+ | Ti-26.4, B-13.6, 304-60 | 960 | Thermocouple failed | |
| $TiB_2$-30 | Si | Ti-20.6, B-9.4, Si-70 | N/A | N/A | 0.5-2 |
| $TiB_2$-24++ | Ti | Ti-90, B-10 | N/A | N/A | 5-100 |
| $TiB_2$-31++ | Ti,V | Ti-81, B-13, V-6 | N/A | N/A | |
| $AlZr_2$-30 | Pb | Zr-27.4, Al-2.6, Pb-70 | N/A | N/A | |
| $TiSi_2$-30 | Pb | Ti-13.8, Si-16.2, Pb-70 | 440 | 480 | |
| $AlTi_2$-30 | Pb | Ti-11.2, Al-18.8, Pb-70 | 300 | 380 | |

*Ceramic phase not formed
**Whiskers formed also
***Nickel superalloy (Martin Marietta trademark)
+Stainless (AISI designation)
++Not fully reacted

EXAMPLE 15

In this example, two bodies of a metal-ceramic composite prepared as disclosed herein were welded using a conventional arc welding procedure. Two plates, each having dimensions of about three feet by about three inches and thickness of about one quarter inch, and having a composition of an aluminum matrix with dispersed titanium diboride particles of about 10 weight percent were placed adjacent to each other. The plates were then welded together in two passes using a tungsten inert gas welding procedure with a 3/32 inch tungsten welding rod and an inert gas composition of about 10 percent argon, remainder helium. Subsequent metallographic examination of the completed weld indicated that the weld was essentially free from pores, and no coarsening of titanium diboride particle had occurred.

EXAMPLE 16

This example illustrates the use of the in-situ ceramic forming reaction to produce a weld. Two bodies of an aluminum alloy are suitably cleaned and rinsed and then welded using an arc welding technique using two aluminum welding rods, one rod containing about 10 weight percent titanium and the other containing about 4 weight percent boron. The rods are fed simultaneously and once the rods start to melt, the contained titanium and boron react to form titanium diboride dispersed in the weld filler material.

EXAMPLE 17

Two plates are welded together by a welding rod which forms a metal-ceramic composite by the solvent assisted in-situ ceramic forming reaction set forth previously. The welding rod is prepared by solvent cleaning and drying of an aluminum foil and then rolling about 3.2 grams of foil about 3.7 feet of titanium filaments and about 9.2 ft. of boron filaments such that the rod, once reacted, will contain about 10 percent titanium diboride. The rod has a reactive length of about two inches and is attached to a six-inch handle for operational convenience. The rod is then used as filler material in a tungsten inert gas arc welding unit to weld two plates of aluminum based alloy containing about 4 percent magnesium. A satisfactory weld joint between the two plates is achieved.

EXAMPLE 18

Two plates are welded together by a welding rod which forms a metal-ceramic composite by the solvent assisted in-situ ceramic forming reaction set forth previously. The welding rod is formed by twisting filaments and wires of the components for the in-situ reaction into a coherent welding rod. Used are a 0.25 mm diameter aluminum wire, a 0.25 mm titanium wire and a boron filament of about 5.6 mil having a small diameter core of tungsten. The particular length of each of the wire and the filaments used is selected to yield a metal-ceramic composite having a titanium diboride content of about 30 percent upon completion of the in-situ ceramic forming reaction.

The formed rod is then used as filler material in an arc welding procedure utilizing an inert gas shielded tungsten electrode to weld plates of an aluminum based alloy containing about 4 percent magnesium. A sound and coherent weld is obtained.

EXAMPLE 19

This example is somewhat similar to that of Example 18 in that the ceramic particles are formed in-situ as the weld is made. Two plates of a 6061 type aluminum alloy having a composition of about 10.0 weight percent magnesium, about 0.6 weight percent silicon, about 0.28 weight percent manganese and about 0.2 weight percent chromium, remainder aluminum, are placed adjacent to each other. Using a metal inert gas welding technique with an essentially pure titanium electrode, a rod having about 0.23 grams of amorphous boron powder encased in series 1100 aluminum foil (about 99 percent aluminum) is added to the weld puddle. The aluminum and boron rod is about one eighth inch thick and the titanium electrode is about 0.25 millimeters in diameter. The resultant weld is sound and comprises fine particles of titanium diboride uniformly dispersed in a matrix of the aluminum alloy.

EXAMPLE 20

An aluminum alloy was welded using a prereacted metal-ceramic composite as the filler material. The aluminum alloy was of the type commonly known as 6061 aluminum and had the composition set forth in Example 19. Two six inch strips of the aluminum alloy of a thickness of about one eighth inch were immersed in an acid deoxidizing solution for about fifteen minutes and then thoroughly rinsed with water. The six inch edges of the strips to be welded in a butt type weld were beveled at an angle of 37° and then placed adjacent to each other with a root gap of 0.03 inch on a stainless welding support. Filler wire of a composition of about 0.3 weight percent magnesium, about 4.6 weight percent silicon, about 20.0 weight percent titanium diboride and remainder aluminum, formed by the processes disclosed herein, was cleaned in the same manner as the strips. Just prior to welding, the strips were degreased with methyl ethyl ketone.

The two strips were then arc welded with the above filler material using a 2 percent thoriated tungsten electrode, an argon inert gas shield and an AC power supply of about 15-18 volts and about 125-135 amperes. The distance between the electrode and the work was maintained at about 3/32 inch and the welding speed was about 3 to 4 inches per minute. The sequence was then repeated to weld two additional strips of the same composition with the identical filler material.

The welded strips of the second run were then sectioned into ten samples, nine of which were tested for tensile properties. On each of these tested samples, the weld bead was machined to provide the sample with a uniform thickness, and seven of the samples were subjected to the standard T6 type heat treatment for a 6061 aluminum alloy. Two additional samples were also taken for optical and hardness measurements, but were not machined as were the other samples.

The tensile properties for the samples were as follows, the sample number indicating the sequence in which the samples were located in the weldment:

| Sample No. | Ultimate Tensile Strength (psi) | Comment |
| --- | --- | --- |
| 1 | 41,599 | |
| 2 | 38,011 | |
| 3 | 21,703 | no heat treatment |
| 4 | 41,882 | |
| 5 | 42,855 | |
| 6 | 33,641 | |
| 7 | 21,800 | no heat treatment |
| 8 | | not tested |
| 9 | 34,526 | |
| 10 | 27,692 | |

The heat treated samples all failed in the weld area, whereas the non-heat treated samples failed in the heat affected zone. Samples 7 and 9 were heavily contaminated, and sample 10 failed due to lack of fusion.

The two samples for hardness measurements were both polished and one was solution heat treated and aged to a T6 condition. Microhardness measurements were then made across the weld and portion of the base metal for each sample. In the non-heat treated welded sample, the hardness of the base metal varied from about 70-80 kg/mm$^2$ whereas the weld hardness varied from about 75-90 kg/mm$^2$ The heat treated sample had a hardness in the base metal varying from about 110-120 kg/mm$^2$ and the weld hardness ranged from about 120-130 kg/mm$^2$ These hardness measurements indicated that the weld material responds to heat treatment at least as much as the base metal material.

Examination of photomicrographs of the weld indicated that some of the titanium diboride particles tended to agglomerate together, leaving regions of fine titanium diboride dispersed between them. Stereoscopic micrographs of the agglomerated titanium diboride particles seemed to show the particles in a matrix of silicon, which may be due to the fact that silicon wets titanium diboride to a greater degree than does aluminum.

EXAMPLE 21

Two plates of a conventional aluminum alloy were welded using a filler material of a metal-ceramic composite. The plates to be welded were a 6061 type aluminum alloy, and were chemically cleaned and wire brushed prior to welding. The filler material was composed of a matrix metal of a type 5356 aluminum alloy and contained about 10 weight percent titanium diboride. A type 5356 aluminum alloy essentially contains about 5 weight percent magnesium, incidental impurities, and remainder aluminum.

The two plates were inert gas arc welded using a 5/32 inch diameter tungsten electrode containing 2 percent zirconia and an inert gas containing about 25 percent argon and the remainder helium. The filler material was in the form of a fine wire of about 0.130 inches in diameter. Welding of the two plates was conducted in six passes with a cool down between passes and no filler material being added in the last two passes. Amperage during the passes was from about 180 to about 260 and the voltage was maintained at about 17 volts.

Figure 3:
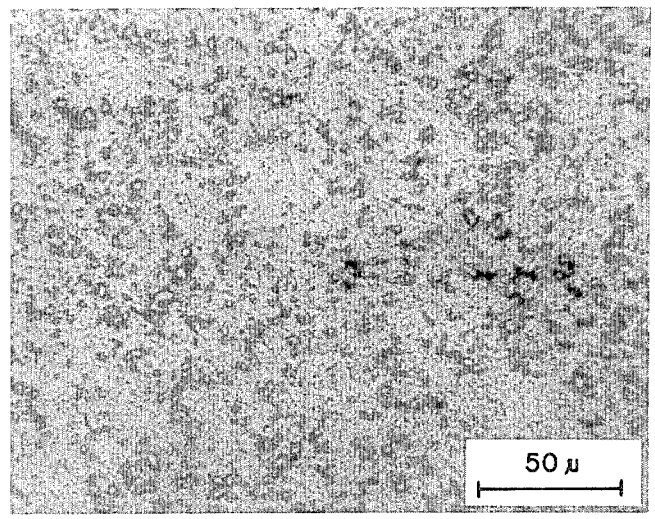
FIG. 3 is a photomicrograph of a weld made with conventional aluminum alloy.

Upon examination, the weld produced appeared sound and the titanium diboride was of a fine particle size with no evidence of agglomeration. A photomicrograph of a portion of the solidified filler weld is shown in FIG. 3. As can be seen, the weld exhibits a typical eutectic dendritic structure and relatively coarse grains. Testing for the tensile properties of the welded plates before and after a heat treatment produced failure sites in the plates rather than in the weld, indicating that the weld had greater strength than the plate. For heat treated specimens, the ultimate tensile strength averaged about 25.9 ksi and the elongation averaged about 11.6 percent. For non-heat treated specimens, the ultimate tensile strength averaged about 19.1 ksi and the elongation averaged about 19.0 percent.

EXAMPLE 22

A conventional aluminum alloy was used as a filler material to weld two plates of a metal-ceramic composite produced by the processes disclosed herein. The filler material was a type 5356 aluminum alloy which had been degassed and pressed, and the plates to be welded had a metal matrix of a 6061 type aluminum alloy and contained about 15 weight percent titanium diboride.

The welding procedure used was essentially the same as that used in Example 21, except that the weld was wire brushed between passes and the current utilized was between about 190 and about 260 amperes. In addition, prior to welding, the filler wire was treated to remove a layer of about 0.010 inches of material from the exterior of the wire. The procedure for treating the wire was to wipe the wire with solvent, clean the wire with alkaline solution, rinse with water, chemically mill with a solution containing hydrofluoric acid, nitric acid, and chromic acid, and finally rinse with water.

Figure 4:
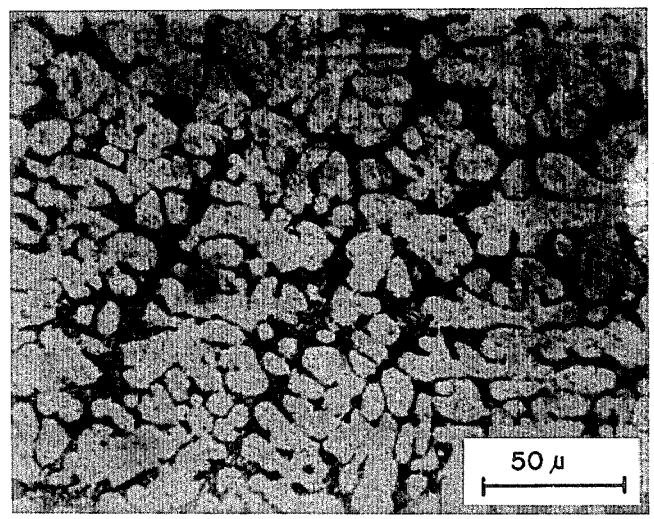
FIG. 4 is a photomicrograph of a weld made with a metal-ceramic composite of titanium diboride in an aluminum alloy.

The resultant weld appeared sound and strong. A photomicrograph of an etched section of the weld, as is shown in FIG. 4, indicates a good weld with no porosity, an even dispersion of fine titanium diboride particles, and a fine grain structure. The lack of porosity was believed to be due to the fact that the filler material prior to welding had been degassed and compacted by hot isostatic pressing.

EXAMPLE 23

Two plates of a metal-ceramic composite formed by the processes disclosed herein were welded with filler material of a second metal-ceramic composite, also formed by the processes herein. The plates had a metal matrix corresponding to a 6061 aluminum alloy and contained 15 weight percent titanium diboride. The filler material had a metal matrix corresponding to a 5356 aluminum alloy and contained about 10 weight percent titanium diboride.

The welding procedure was the same as that set forth in Example 22 with the exception that the current used during the passes was in the range of 220-230 amperes.

A weld was formed but the weld was rather porous, due probably to the fact that the plates had not been degassed, and thus it was thought that the gases released from the plate caused the porosity.

EXAMPLE 24

Plates of a conventional aluminum alloy are welded with a filler material of a metal-ceramic composite prepared by the processes disclosed herein, and the weld compared to a weld for the same type plates formed with a filler material of the matrix metal alone. The plates of this example comprised an aluminum alloy containing 5.41 zinc weight percent and 2.06 weight percent magnesium. The filler material was composed of a metal matrix corresponding to a 5356 aluminum alloy and contained about 10 weight percent titanium diboride, and the comparison filler material was a 5356 aluminum alloy.

The plates were about ½ inch thick and about six inches long, the composite wire filler material was about ⅛ inch thick, and the metal wire filler material was about 3/32 inch thick. The plates and filler materials were chemically milled in a cleaning bath so as to reduce the exterior oxide layer to about 15 Angstroms. Just prior to welding, each plate was brushed with a stainless steel wire brush and wiped with methyl ethyl ketone. The edges of each plate to be welded were beveled at an angle of 37.5° and provided with a root gap of about 3/32 of an inch.

The plates were then arc welded using 3/32 inch tungsten electrode containing 2 percent zirconia with argon inert gas shielding. The welding was performed in two passes using AC control and with voltages between 10-12 volts and current of 150 and 180 amps in the first pass, and 185 and 195 amperes in the second pass for the metal and composite filler material, respectively. Wire brushing was conducted between passes to remove dirt and porosity.

The welded plates were then cut into tensile samples, a portion of the samples for each plate being subjected to heat treatment and artificial aging. In tensile testing, all failures occurred in the plates or in the heat affected zone, yielding ultimate tensile strength value of about 34 ksi and a yield strength of about 30 ksi.

The overwhelming importance of steel weldments may be emphasized, based upon the commercial aspects of steel utilization, world-wide. The present invention is very suitable for use in welding steel, is illustrated by Examples 25 and 26.

EXAMPLE 25

Two ½ inch plates of HY-100 steel are placed in close proximity and arranged for butt-welding using a low-carbon (0.1 weight percent) weld rod containing 15 volume percent of dispersoids. The weld rod is prepared by mixing powders of iron, boron and titanium, in stoichiometric proportions, to form a 60 weight percent $TiB_2$ in iron composite, and subsequently compacting these into a rod, heating under an atmosphere of argon gas until the reaction initiation temperature is reached, and then allowing the reacted concentrate to cool. The concentrate is then added to a molten bath of low carbon steel containing the appropriate amounts of alloying elements to achieve a final alloy composition of 0.1 percent carbon, 1 percent manganese, 0.2 percent silicon, 2.5 percent nickel, 0.45 percent chromium, 0.4 percent molybdenum balance iron. The alloy is cast and fabricated into a 1/16" diameter rod.

An arc is struck between a tungsten electrode and the metals to be welded, and is protected by an inert gas atmosphere. The weld rod is fed into the joint at a rate sufficient to affect welding in several passes. The weldment exhibits a uniform distribution of dispersoids, fine grain size and uniform distribution of alloying elements. The weldment also exhibits high modulus, high strength, high fracture toughness, low ductile-to-brittle transition temperature, and superior stress corrosion and fatigue resistance.

EXAMPLE 26

A weld rod is prepared by mixing powders of iron, boron and titanium in proportions to form a 60 weight percent $TiB_2$ in iron composite, and subsequently compacting these ingredients into a rod, heating under an atmosphere of argon gas until the reaction initiation temperature is reached, and then allowing the reacted concentrate to cool. The concentrate is then added to a molten bath of low carbon steel containing the appropriate amounts of alloying elements to achieve a final alloy composition of 0.1 percent carbon, 1 percent magnanese, 0.2 percent silicon, 2.5 percent nickel, 0.45 percent chromium, 0.4 percent molybdenum, balance iron. The alloy is cast and fabricated into a 1/16" diameter rod.

The weldment is prepared by striking an arc between the weld rod itself and the base alloy to be welded. The weld filler microstructure is uniform, exhibiting uniform distribution of dispersoids and alloying elements and fine grain size. Improved mechanical properties are noted including high modulus, high strength, high fracture toughness, low ductile to brittle transition temperature, and superior stress corrosion and fatigue resistance.

It is noted that using the metal-ceramic composites prepared by the processes disclosed herein in welding applications provides a number of advantages. For example, the metal-ceramic composites with a ceramic phase precipitated therein provide a weld having superior hardness and modulus qualities over currently employed composites such as those containing silicon carbide. Welds of the metal-ceramic composites also have improved high temperature stability, in that the ceramic phase is not reactive with the metal matrix and possess superior corrosion resistance. Further, shaped materials prepared of the disclosed metal-ceramic composites can be welded without degradation of material properties, as contrasted with conventional available metal-ceramic composites such as SiC aluminum.

It is understood that the above description of the present invention is susceptible to considerable modification, change, and adaptation by those skilled in the art, and such modifications, changes, and adaptations are intended to be considered to be within the scope of the present invention, which is set forth by the appended claims.

We claim:

1. A method for welding, said method comprising providing first and second bodies, each body being of a metal containing material and having a welding surface, placing said bodies such that a welding surface of the first body is in close proximity to a welding surface of the second body, and welding the bodies together by contacting reactive ceramic forming constituents, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate submicron ceramic particles in-situ in said solvent metal so as to produce a material comprising finely divided ceramic particles in a metal matrix in such a position as to join the two welding surfaces.

2. A method as set forth in claim 1, wherein the reactive ceramic forming constituents are each provided as an alloy of the solvent metal.

3. A method as set forth in claim 1, wherein the first body is an alloy and the second body is an alloy.

4. A method as set forth in claim 1, wherein the first body is an alloy and the second body is a composite of finely divided ceramic particles in a metal matrix.

5. A method as set forth in claim 1, wherein the first and the second bodies are each a composite of finely divided ceramic particles in a metal matrix.

6. A method as set forth in claim 1, wherein the temperature is at least about the melting temperature of said solvent metal.

7. A method as set forth in claim 1, wherein the reactive ceramic forming constituents and the solvent metal are each provided as individual elements.

8. A method as set forth in claim 1, wherein the reactive ceramic forming constituents are powders and the solvent metal is a foil containing the powders.

9. A method as set forth in claim 1, wherein the reactive ceramic forming constituents are provided as filaments.

10. A method as set forth in claim 9, wherein the solvent metal is a filament.

11. A method as set forth in claim 1, wherein at least one ceramic forming constituent is selected from the group consisting of transition metals of the third to sixth groups of the Periodic Table.

12. A method as set forth in claim 11, wherein at least one ceramic forming constituent is selected from the group consisting of aluminum, titanium, silicon, boron, carbon, sulfur, germanium, molybdenum, tungsten, vanadium, zirconium, chromium, magnesium, hafnium, tantalum, nitrogen, and rare earth metals.

13. A method as set forth in claim 12, wherein said solvent metal is selected from the group consisting of aluminum, gallium, nickel, titanium, copper, vanadium, chromium, manganese, cobalt, iron, silicon, germanium, silver, gold, platinum, palladium, rhodium, ruthenium, magnesium, lead, zinc, tin, tantatum, molybdenum, tungsten, hafnium, niobium, rhenium, zirconium, and alloys and intermetallics of such metals.

14. A method as set forth in claim 13, wherein said solvent metal is selected from the group consisting of aluminum, zinc, magnesium, copper, lead, nickel, chromium, iron, titanium, cobalt, and alloys and intermetallics of such metals.

15. A method as set forth in claim 14, wherein said ceramic forming constituents are each selected from the group consisting of titanium, zirconium, magnesium, boron, silicon, and carbon.

16. A method as set forth in claim 15, wherein the solvent metal contains aluminum and the ceramic forming constituents are titanium and boron.

17. A method as set forth in claim 16, wherein the first and second bodies each contain aluminum and no silicon.

18. A method as set forth in claim 1, wherein the metal of the first body is selected from the group consisting of aluminum, zinc, magnesium, copper, lead, nickel, chromium, iron, titanium, cobalt, tantalum, molybdenum, tungsten, hafnium, niobium, rhenium, zirconium and alloys of such metals.

19. A method as set forth in claim 18, wherein the metal of the second body is also selected from the group consisting of aluminum, zinc, magnesium, copper, nickel, chromium, iron, titanium, cobalt, tantalum, molybdenum, tungsten, hafnium, niobium, rhenium, zirconium and alloys of such metals.

20. A method for making a welding rod comprising precipitating at least one ceramic material in a metal matrix by contacting reactive ceramic forming constituents, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate submicron ceramic particles in-situ in said solvent metal so as to produce a material comprising finely divided ceramic particles in a metal matrix, and forming the produced material into a welding rod shape.

21. A method as set forth in claim 20, wherein the temperature is at least about the melting temperature of said solvent metal.

22. A method as set forth in claim 20, wherein the reactive ceramic forming constituents and the solvent metal are each provided as individual elements.

23. A method as set forth in claim 20, wherein the ceramic forming constituents are each provided as an alloy of said solvent metal.

24. A method as set forth in claim 20, wherein at least one ceramic forming constituent is selected from the group consisting of transition metals of the third to sixth groups of the Periodic Table.

25. A method as set forth in claim 20, wherein at least one ceramic forming constituent is selected from the group consisting of aluminum, titanium, silicon, boron, carbon, sulfur, germanium, molybdenum, tungsten, vanadium, zirconium, chromium, magnesium, hafnium, tantalum, nitrogen, and rare earth metals.

26. A method as set forth in claim 25, wherein said solvent metal is selected from the group consisting of aluminum, gallium, nickel, titanium, copper, vanadium, chromium, manganese, cobalt, iron, silicon, germanium, silver, gold, platinum, palladium, rhodium, ruthenium, magnesium, lead, zinc, tin, tantalum, molybdenum, tungsten, hafnium, niobium, rhenium, zirconium and alloys and intermetallics of such metals.

27. A method as set forth in claim 26, wherein said solvent metal is selected from the group consisting of aluminum, zinc, magnesium, copper, lead, nickel, chromium, iron, titanium, cobalt, and alloys of such metals.

28. A method as set forth in claim 25, wherein said ceramic forming constituents are each selected from the group consisting of titanium, zirconium, magnesium, boron, silicon, and carbon.

29. A method as set forth in claim 20, wherein the solvent metal contains aluminum and the ceramic forming constituents are titanium and boron.

30. A method as set forth in claim 20, wherein the produced material is formed into the welding rod shape by steps including extruding.

31. A method as set forth in claim 20, wherein the produced material is formed into the welding rod shape by steps including mechanical working.

32. A method comprising precipitating at least one ceramic material in a metal matrix by contacting reactive ceramic forming constituents, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate ceramic particles in-situ in said solvent metal so as to produce a composite material comprising finely divided ceramic particles in a metal matrix, diluting said composite material in an additional matrix metal so as to produce a body of material comprising said finely divided ceramic particles in a second metal matrix, placing the produced body adjacent a second metal containing body, placing filler material between said produced body and said second body in such a position as to join said bodies, welding the produced body to the second body by subjecting said filler material to a temperature sufficient to melt at least a portion of the filler material, and then solidifying the filler material, thereby joining the produced body to the second body.

33. A method as set forth in claim 32, wherein the filler material is a metal alloy.

34. A method as set forth in claim 32, wherein the filler material is finely divided ceramic particles in a metal matrix.

35. A method as set forth in claim 32, wherein the welding is conducted by arc welding using a metal electrode and inert gas shielding.

36. A method as set forth in claim 32, wherein the ceramic forming reaction occurs in the liquid state.

37. A method as set forth in claim 32, wherein at least one ceramic forming constituent is selected from the group consisting of transition metals of the third to sixth groups of the Periodic Table.

38. A method as set forth in claim 37, wherein at least one ceramic forming constituent is selected from the group consisting of aluminum, titanium, silicon, boron, carbon, sulfur, germanium, molybdenum, tungsten, vanadium, zirconium, chromium, magnesium, hafnium, tantalum, nitrogen, and rare earth metals.

39. A method as set forth in claim 38, wherein said solvent metal is selected from the group consisting of aluminum, gallium, nickel, titanium, copper, vanadium, chromium, manganese, cobalt, iron, silicon, germanium, silver, gold, platinum, palladium, rhodium, ruthenium, magnesium, lead, zinc, tin, tantalum, molybdenum, tungsten, hafnium, niobium, rhenium, zirconium and alloys of such metals.

40. A method as set forth in claim 39, wherein said solvent metal is selected from the group consisting of aluminum, zinc, magnesium, copper, lead, nickel, chromium, iron, titanium, cobalt, and alloys of such metals.

41. A method as set forth in claim 40, wherein said ceramic forming constituents are each selected from the group consisting of titanium, zirconium, magnesium, boron, silicon, and carbon.

42. A method as set forth in claim 41, wherein said solvent metal is aluminum or an alloy thereof.

43. A method as set forth in claim 42, wherein the ceramic material is titanium diboride and the filler material includes aluminum.

44. A method as set forth in claim 32, wherein said second body comprises finely divided ceramic particles in a metal matrix.

45. A method as set forth in claim 44, wherein said second body is produced by precipitating at least one ceramic material in a metal matrix by contacting reactive ceramic forming constituents, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate ceramic particles in-situ in said solvent metal so as to produce a composite material comprising finely divided ceramic particles in a metal matrix, and diluting said composite material in an additional matrix metal so as to produce a body of material comprising said finely divided ceramic particles in a second metal matrix.

46. A method as set forth in claim 45, wherein at least one ceramic forming constituent for the second body is selected from the group consisting of aluminum, titanium, silicon, boron, carbon, sulfur, germanium, molybdenum, tungsten, vanadium, zirconium, and chromium.

47. A method as set forth in claim 46, wherein said solvent metal of the second body is selected from the group consisting of aluminum, gallium, nickel, titanium, copper, vanadium, chromium, manganese, cobalt, iron, silicon, germanium, silver, gold, platinum, palladium, rhodium, ruthenium, magnesium, lead, zinc, tin, tantalum, molybdenum, tungsten, hafnium, niobium, rhenium, zirconium and alloys of such metals.

48. A method as defined in claim 47, wherein the ceramic forming constituents in said second booy include titanium and boron and the solvent metal includes aluminum.

49. A method as set forth in claim 48, wherein the filler material is an aluminum alloy containing magnesium.

50. A method for joining two metal containing bodies, said method comprising producing a composite material comprising finely divided ceramic particles in a metal matrix by precipitating at least one ceramic material in a metal matrix by contacting reactive ceramic forming constituents, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate ceramic particles in-situ in said solvent metal, diluting said composite material in an additional matrix metal so as to produce a filler material comprising said finely divided ceramic particles in a second metal matrix, placing the two metal containing bodies in close proximity to each other, subjecting said filler material to a temperature sufficient to melt at least some of said filler material and deposit the molten filler material between the closely placed metal-containing bodies in order to provide a bond between said bodies, and solidfying the molten filler material so as to join the bodies.

51. A method as set forth in claim 50, wherein the two bodies are each an alloy.

52. A method as set forth in claim 50, wherein one body is an alloy and the other body is an composite of finely divided ceramic particles in a metal matrix.

53. A method as set forth in claim 50, wherein the bodies are each a composite of finely divided ceramic particles in a metal matrix.

54. A method as set forth in claim 53, wherein said bodies are produced by contacting reactive ceramic forming constitutents, in the presence of a solvent metal in which said ceramic forming constitutents are more soluble than said ceramic material, at a temperature at which sufficient diffusion of said reactive ceramic forming constituents into said solvent metal occurs to cause a ceramic forming reaction of said constituents and thereby precipitate ceramic particles in-situ in said solvent metal so as to provide a composite material, and diluting said composite material in a matrix metal.

55. A method as set forth in claim 54, wherein said solvent metal of the bodies is selected from the group consisting of aluminum, zinc magnesium, copper lead, nickel, chromium, iron, titanium, cobalt, and alloys of such metals.

56. A method as set forth in claim 55, wherein said ceramic forming constituents of the bodies are each selected from the group consisting of titanium, zirconium, magnesium, boron, silicon, and carbon.

57. A method as set forth in claim 56, wherein the solvent metal of the bodies contains aluminum and the ceramic forming constituents are titanium and boron.

58. A method as set forth in claim 50, wherein the temperature for precipitating is at least about the melting temperature of said solvent metal.

59. A method as set forth in claim 50, wherein at least one ceramic forming constituent is selected from the group consisting of aluminum, titanium, silicon, boron, carbon, sulfur, germanium, molybdenum, tungsten, vanadium, zirconium, chromium, magnesium, hafnium, tantalum, nitrogen, and rare earth metals.

60. A method as set forth in claim 59, wherein said solvent metal is selected from the group consisting of aluminum, gallium, nickel, titanium, copper, vanadium, chromium, manganese, cobalt, iron, silicon, germanium, silver, gold, platinum, palladium, rhodium, ruthenium, magnesium, lead, zinc, tin, tantalum: molybdenum, tungsten, hafnium, niobium, rhenium, zirconium and alloys of such metals.

61. A method as set forth in claim 60, wherein said solvent metal is selected from the group consisting of aluminum, zinc, magnesium, copper, lead, nickel, chromium, iron, titanium, cobalt, and alloys of such metals.

62. A method as set forth in claim 61, wherein said ceramic forming constituents are each selected from the group consisting of titanium, zirconium, magnesium, boron, silicon, and carbon.

63. A method as set forth in claim 62, wherein the solvent metal contains aluminum and the ceramic forming constituents are titanium and boron.

64. A method as set forth in claim 63, wherein the first and second bodies each contain aluminum and no silicon.

65. A method as set forth in claim 50, wherein the metal of the first body is selected from the group consisting of aluminum, zinc, magnesium, copper, lead, nickel, chromium, iron, titanium, cobalt, and alloys of such metals.

66. A method as set forth in claim 50, wherein the metal of the second body is also selected from the group consisting of aluminum, zinc, magnesium, copper, lead, nickel, chromium, iron, titanium, cobalt, and alloys of such metals.

67. A method for producing a weld on a metal containing body, said method comprising producing a composite material comprising finely divided ceramic particles in a metal matrix by precipitating at least one ceramic material in a metal matrix by contacting reactive ceramic forming constituents, in the presence of a solvent metal in which said ceramic forming constituents are more soluble than said ceramic material, at a temperature at which sufficient diffusion of said reactive ceramic forming constituents into said solvent metal occurs to cause a ceramic forming reaction of said constituents and thereby precipitate submicron ceramic particles in-situ in said solvent metal, diluting said composite material in an additional matrix matel so as to produce a filler material comprising said finely divided ceramic particles in a second metal matrix, sujecting said filler material to a temperature sufficient to melt at least some of said filler and deposit the molten filler material on the body, and solidifying the molten filler material on the body.

68. A method as set forth in claim 67, wherein the body is an alloy.

69. A method as set forth in claim 67, wherein the body is a composite of finely divided ceramic particles in a metal matrix.

70. A method as set forth in claim 67, wherein the temperature for precipitating is at least about the melting temperature of said solvent metal.

71. A method as set forth in claim 67, wherein at least one ceramic forming constituent is selected from the group consisting of aluminum, titanium, silicon, boron, carbon, sulfur, germanium, molybdenum, tungsten, vanadium, zirconium, chromium, magnesium, hafnium, tantalum, nitrogen, and rare earth metals.

72. A method as set forth in claim 71, wherein said solvent metal is selected from the group consisting of aluminum, gallium, nickel, titanium, copper, vanadium, chromium, manganese, cobalt, iron, silicon, germanium, silver, gold, platinum, palladium, rhodium, ruthenium, magnesium, lead, zinc, tin, tantalum, molybdenum, tungsten, hafnium, niobium, rhenium, zirconium and alloys of such metals.

73. A method as set forth in claim 72, wherein said solvent metal is selected from the group consisting of aluminum, zinc, magnesium, copper, lead, nickel, chromium, iron, titanium, cobalt, and alloys of such metals.

74. A method as set forth in claim 73, wherein said ceramic forming constituents are each selected from the group consisting of titanium, zirconium, magnesium, boron, silicon, and carbon.

75. A method as set forth in claim 74, wherein the solvent metal contains aluminum and the ceramic forming constituents are titanium and boron.

76. A method as set forth in claim 67, wherein the metal of the body is selected from the group consisting of aluminum, zinc, magnesium, copper, nickel, chromium, iron, titanium, cobalt, and alloys of such metals.

77. A method as set forth in claim 76, wherein the body contains aluminum and no silicon.

* * * * *